United States Patent
Stolorz et al.

(10) Patent No.: US 10,116,738 B2
(45) Date of Patent: *Oct. 30, 2018

(54) DETECTING ANOMALOUS CONDITIONS IN A NAME SERVER NETWORK

(71) Applicant: LEVEL 3 COMMUNICATIONS, LLC, Broomfield, CO (US)

(72) Inventors: Paul E. Stolorz, Los Altos, CA (US); John K. Salmon, Chappaqua, NY (US); Michael S. Warren, Santa Fe, NM (US); Jeffrey G. Koller, Oxnard, CA (US); Aric Hagberg, Santa Fe, NM (US); Maksim Yevmenkin, Thousand Oaks, CA (US); Mark Brady, Thousand Oaks, CA (US); David Pfitzner, College Park (AU); Ted Middleton, Moorpark, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,092

(22) Filed: Nov. 30, 2015

(65) Prior Publication Data

US 2016/0255146 A1 Sep. 1, 2016

Related U.S. Application Data

(63) Continuation of application No. 11/932,162, filed on Oct. 31, 2007, now Pat. No. 9,203,636, which is a
(Continued)

(51) Int. Cl.
*G06F 15/173* (2006.01)
*H04L 29/08* (2006.01)
(Continued)

(52) U.S. Cl.
CPC .......... *H04L 67/1034* (2013.01); *H04L 29/06* (2013.01); *H04L 29/12066* (2013.01);
(Continued)

(58) Field of Classification Search
CPC ... H04L 67/1034; H04L 43/04; H04L 41/069; H04L 41/0631; H04L 67/1036;
(Continued)

(56) References Cited

U.S. PATENT DOCUMENTS 6,052,788 A 4/2000 Wesinger et al.
6,092,178 A 7/2000 Jindal et al.
(Continued)

FOREIGN PATENT DOCUMENTS

EP 0817020 A2 1/1998
EP 0817444 A2 1/1998
(Continued)

OTHER PUBLICATIONS

Chinese Reexamination Decision, dated Jun. 18, 2014, Application No. 02821371.8, filed Sep. 30, 2002; 7 pgs.
(Continued)

*Primary Examiner* — John B Walsh

(57) ABSTRACT

A method includes monitoring the operational status of at least some name servers in a name server network. Based on the monitoring, when an error or anomalous condition is detected at a particular name server, creating a policy to indicate the status of the particular name server. The policy is taken into account when resolving hostnames using the name server network.

15 Claims, 22 Drawing Sheets

Related U.S. Application Data continuation of application No. 10/259,497, filed on Sep. 30, 2002, now Pat. No. 7,822,871.

(60) Provisional application No. 60/325,177, filed on Sep. 28, 2001.

(51) Int. Cl.

| | | |
|---|---|---|
| *H04L 29/06* | (2006.01) | |
| *H04L 29/12* | (2006.01) | |
| *H04L 12/24* | (2006.01) | |
| *H04L 12/26* | (2006.01) | |
| *H04W 4/02* | (2018.01) | |
| *H04W 4/021* | (2018.01) | |
| *H04W 4/20* | (2018.01) | |

(52) U.S. Cl.
CPC ...... *H04L 29/12783* (2013.01); *H04L 41/069* (2013.01); *H04L 41/0631* (2013.01); *H04L 41/0893* (2013.01); *H04L 41/22* (2013.01); *H04L 43/00* (2013.01); *H04L 43/04* (2013.01); *H04L 61/1511* (2013.01); *H04L 61/35* (2013.01); *H04L 67/1002* (2013.01); *H04L 67/1008* (2013.01); *H04L 67/1021* (2013.01); *H04L 67/1023* (2013.01); *H04L 67/1029* (2013.01); *H04L 67/1036* (2013.01); *H04L 67/18* (2013.01); *H04L 67/26* (2013.01); *H04W 4/02* (2013.01); *H04W 4/021* (2013.01); *H04W 4/20* (2013.01); *H04L 43/045* (2013.01); *H04L 43/06* (2013.01); *H04L 43/0811* (2013.01); *H04L 43/0817* (2013.01); *H04L 43/0852* (2013.01); *H04L 43/10* (2013.01); *H04L 43/12* (2013.01); *H04L 67/02* (2013.01); *H04L 67/1031* (2013.01); *H04L 69/329* (2013.01)

(58) Field of Classification Search
CPC ..... H04L 67/26; H04L 67/1002; H04L 67/18; H04L 67/1023; H04L 67/1008; H04L 67/1029; H04L 67/1021; H04L 12/2602; H04L 61/1511; H04L 61/35; H04L 29/12066; H04L 29/12783; H04L 41/0893; H04L 41/22; H04L 43/00; H04L 29/06; H04L 67/02; H04L 67/1031; H04L 69/329; H04L 43/0852; H04L 43/12; H04L 43/0811; H04L 43/06; H04L 43/10; H04L 43/045; H04L 43/0817; H04W 4/02; H04W 4/20
See application file for complete search history.

(56) References Cited

U.S. PATENT DOCUMENTS

| | | | |
|---|---|---|---|
| 6,157,648 A | 12/2000 | Voit et al. | |
| 6,282,574 B1 | 8/2001 | Voit | |
| 6,484,261 B1 | 11/2002 | Wiegel | |
| 6,587,876 B1* | 7/2003 | Mahon | H04L 41/0893 709/203 |
| 6,605,120 B1 | 8/2003 | Fields et al. | |
| 6,976,090 B2 | 12/2005 | Ben-shaul | |
| 7,103,645 B2 | 9/2006 | Leighton et al. | |
| 7,185,052 B2 | 2/2007 | Day | |
| 7,188,317 B1* | 3/2007 | Hazel | G06F 9/4443 715/804 |
| 7,219,153 B1 | 5/2007 | Day | |
| 7,373,644 B2 | 5/2008 | Aborn | |
| 7,577,754 B2 | 8/2009 | Garcia-Luna-Aceves et al. | |
| 7,716,367 B1* | 5/2010 | Leighton | H04L 29/12066 709/226 |
| 2002/0010798 A1* | 1/2002 | Ben-Shaul | G06F 17/3089 709/247 |
| 2002/0087684 A1 | 7/2002 | Foth | |
| 2002/0116444 A1 | 8/2002 | Chaudhri et al. | |
| 2002/0143914 A1* | 10/2002 | Cihula | H04L 41/0893 709/223 |
| 2002/0145975 A1 | 10/2002 | MeLampy et al. | |
| 2004/0010588 A1 | 1/2004 | Slater et al. | |
| 2004/0064832 A1 | 4/2004 | Tsukidate et al. | |
| 2005/0060493 A1 | 3/2005 | Krissell et al. | |
| 2005/0240966 A1 | 10/2005 | Hindle et al. | |
| 2007/0055764 A1 | 3/2007 | Dilley et al. | |
| 2009/0254661 A1 | 10/2009 | Fullagar et al. | |
| 2010/0169772 A1 | 7/2010 | Stallings et al. | |
| 2010/0312861 A1 | 12/2010 | Kolhi et al. | |
| 2010/0332595 A1 | 12/2010 | Fullagar et al. | |
| 2011/0145386 A1 | 6/2011 | Stolorz et al. | |

FOREIGN PATENT DOCUMENTS

| | | |
|---|---|---|
| GB | 2354350 | 3/2001 |
| WO | WO-200014633 | 3/2000 |
| WO | WO-200026806 A2 | 5/2000 |
| WO | WO-200041091 A1 | 7/2000 |
| WO | WO-2000/052594 A2 | 9/2000 |
| WO | WO-200052594 A2 | 9/2000 |
| WO | WO-200078004 A2 | 12/2000 |
| WO | WO-200139003 A1 | 5/2001 |

OTHER PUBLICATIONS

Chinese Reexamination Notification, dated Jul. 5, 2012, Appl. No. 02821371.8, 5 pgs.
Chinese Reexamination Notification, dated Sep. 13, 2012, Chinese App. No. 02821371.8, including translation , 10 pgs.
Chinese Reexamination Notification, dated Jan. 10, 2014, Application No. 02821371.8, filed Sep. 30, 2002; 12 pgs.
Decision on Petition, dated Nov. 13, 2013, in U.S. Appl. No. 12/978,537, filed Dec. 24, 2010; 3 pgs.
European Examination Report dated Sep. 6, 2012, EP Application No. 10178695.2, 4 pgs.
European Examination Report, dated Jan. 17, 2014, Application No. 10178695.2, filed Sep. 30, 2002; 3 pgs.
European Examination Report, dated Mar. 25, 2014, Application No. 02799672.7, filed Sep. 30, 2002; 3 pgs.
European Examination Report, dated Nov. 4, 2014, Application No. 02799672.7, filed Sep. 30, 2002; 6 pgs.
European Search Report, dated Mar. 6, 2014, Application No. 10012965.9, filed Sep. 30, 2002; 13 pgs.
Extended European Search Report dated Dec. 6, 2011, App. No. 10178695.2, 7 pgs.
International Search Report, dated Jan. 23, 2012, Intl Appl. No. PCT/US11/51252, Intl Filing Date Sep. 12, 2011, 3 pgs.
Written Opinion of the International Searching Authority, dated Jan. 23, 2012, Intl Appl No. PCT/US11/51252, Intl Filing Date Sep. 12, 2011, 5 pgs.
Durham, D. et al., "The COPS (Common Open Policy Service) Protocol", rfc2748.txt; XP015008531; http://www.sanface.com/txt2pdf.html Jan. 1, 2000 , 39 pgs.
Stevens, Mark L. et al., "Policy-Based Management for IP Networks", *Bell Labs Technical Journal* vol. 4, No. 4 Oct. 1, 1999 , pp. 75-94.
European Examination Report, dated Mar. 1, 2016, Application No. 02799672.7, filed Sep. 30, 2002; 5 pgs.

* cited by examiner

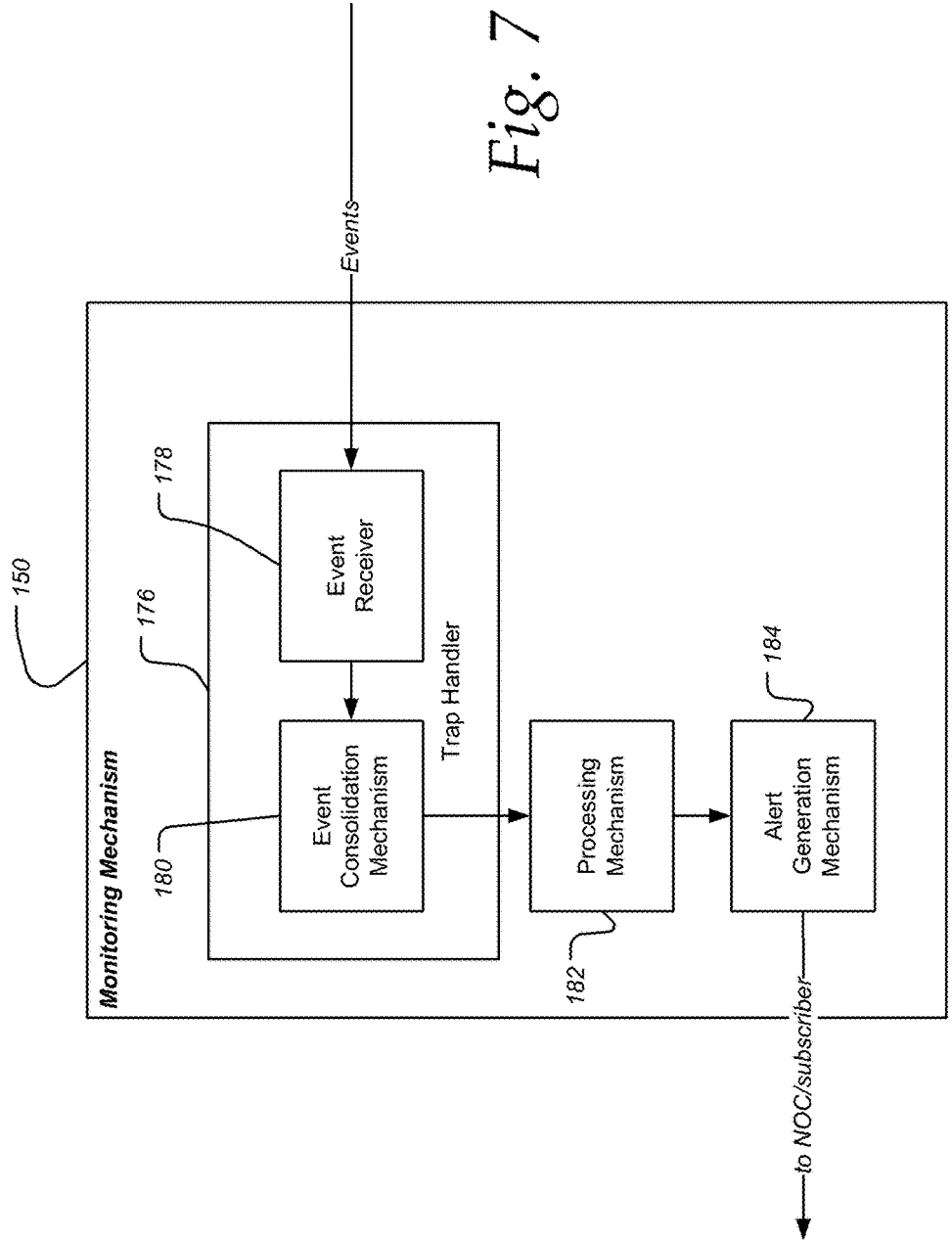

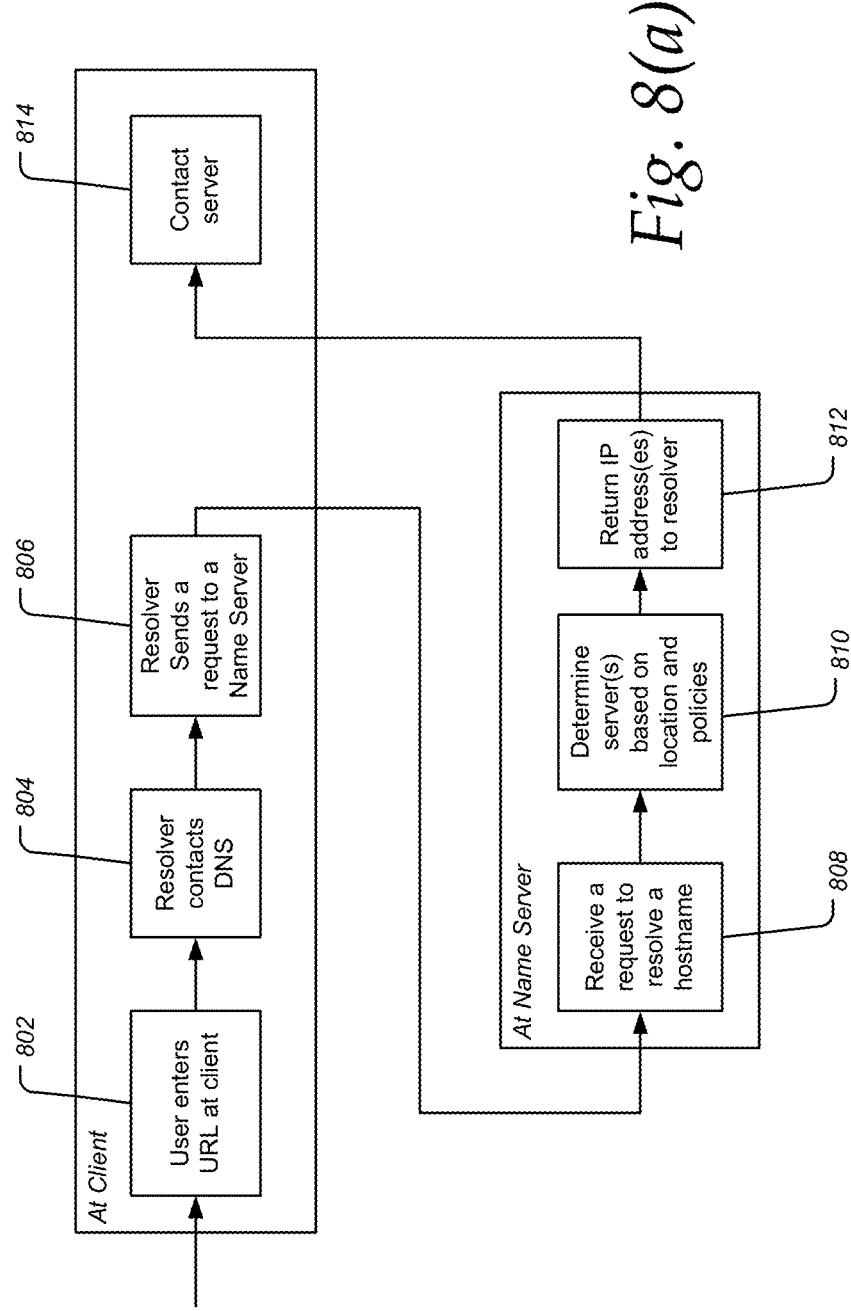

DETECTING ANOMALOUS CONDITIONS IN A NAME SERVER NETWORK

This application is a continuation of U.S. application Ser. No. 11/932,162 filed Oct. 31, 2007, titled "Distributing Requests Across Multiple Content Delivery Networks Based On Subscriber Policy," which is a continuation of U.S. application Ser. No. 10/259,497, filed Sep. 30, 2002, titled "Configurable Adaptive Global Traffic Control And Management," patented as U.S. Pat. No. 7,822,871 on Oct. 26, 2010, and which claims priority from provisional application No. 60/325,177, filed Sep. 28, 2001, the entire contents of each of which are hereby fully incorporated herein by reference for all purposes.

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

FIELD OF THE INVENTION

Aspects of the present invention relate to network traffic management. Other aspects of the present invention relate to configurable, adaptive, global traffic control and management in networks such as the Internet.

BACKGROUND & SUMMARY

As the volume of Internet traffic grows, providers of web content and applications increasingly need to deliver content from multiple servers at widely-separated locations in order to sustain a good end-user experience under high traffic loads. This need generates several difficult challenges, including, among others:
  how to guarantee the fault-tolerance of such a multiple-server system in the face of failure of one or more individual servers;
  how to control the way in which requests from end-users are distributed to each server according to important content provider policy constraints imposed for economic, contractual or other reasons; and
  how to guarantee high performance as experienced by end-users as network conditions change.

This invention solves these and other problems by providing a means to distribute network (e.g., Internet) traffic according to a configurable set of rules. The rules can be configured to take into account key factors such as:
  server availability.
  specific requirements of content providers who deploy the invention, e.g., distribution based upon geography, position in IP address space, load share, etc.
  state of the network (Internet) at any given moment, including measures of network latency.

These rules together provide an extremely fine-grained level of network Internet traffic control to providers of Internet content and applications, enabling them to dramatically improve the end-user experience (measured by speed of request resolution, associated download time, and the availability of servers) over that provided by conventional web servers and mirrored server farms.

There are many potential uses for the invention. One use is to provide a stand-alone service directing traffic exclusively to a set of designated servers managed by a single organization. The invention may also be used in more general ways—for example, one or more of the designated destinations can refer to servers (or server collections) outside the organization's control. The latter case includes, for example, Content Delivery Networks (CDN's), as well as local load-balancing servers, as potential destinations. The invention can also be used, e.g., to provide the DNS (Domain Name Service) component of a Content Delivery Network itself. It can be deployed as a service on behalf of subscribers, or it can be deployed as software to be used directly by subscribers themselves.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein:

FIG. 7 depicts the internal functional block diagram of a monitoring mechanism, according to embodiments of the present invention;

FIG. 8(a) is an exemplary flowchart of a process, in which a content delivery framework provides adaptive policy-based domain name service, according to embodiments of the present invention;

FIG. 9(a) shows an exemplary secure web based graphical interface, through which a subscriber may define load share and shed fraction policies among static resources, according to embodiments of the present invention;

FIG. 9(b) shows an exemplary interface for defining policies for dynamic servers, according to embodiments of the present invention;

FIGS. 11(a)-11(c) show exemplary archived log information that can be displayed and viewed through a graphical user interface, according to embodiments of the present invention.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Although there are a number of different scenarios in which the invention might be deployed, this description will focus, for clarity and example only, on a scenario in which DNS service is provided by a third party on behalf of a content or applications provider.

Figure 1:
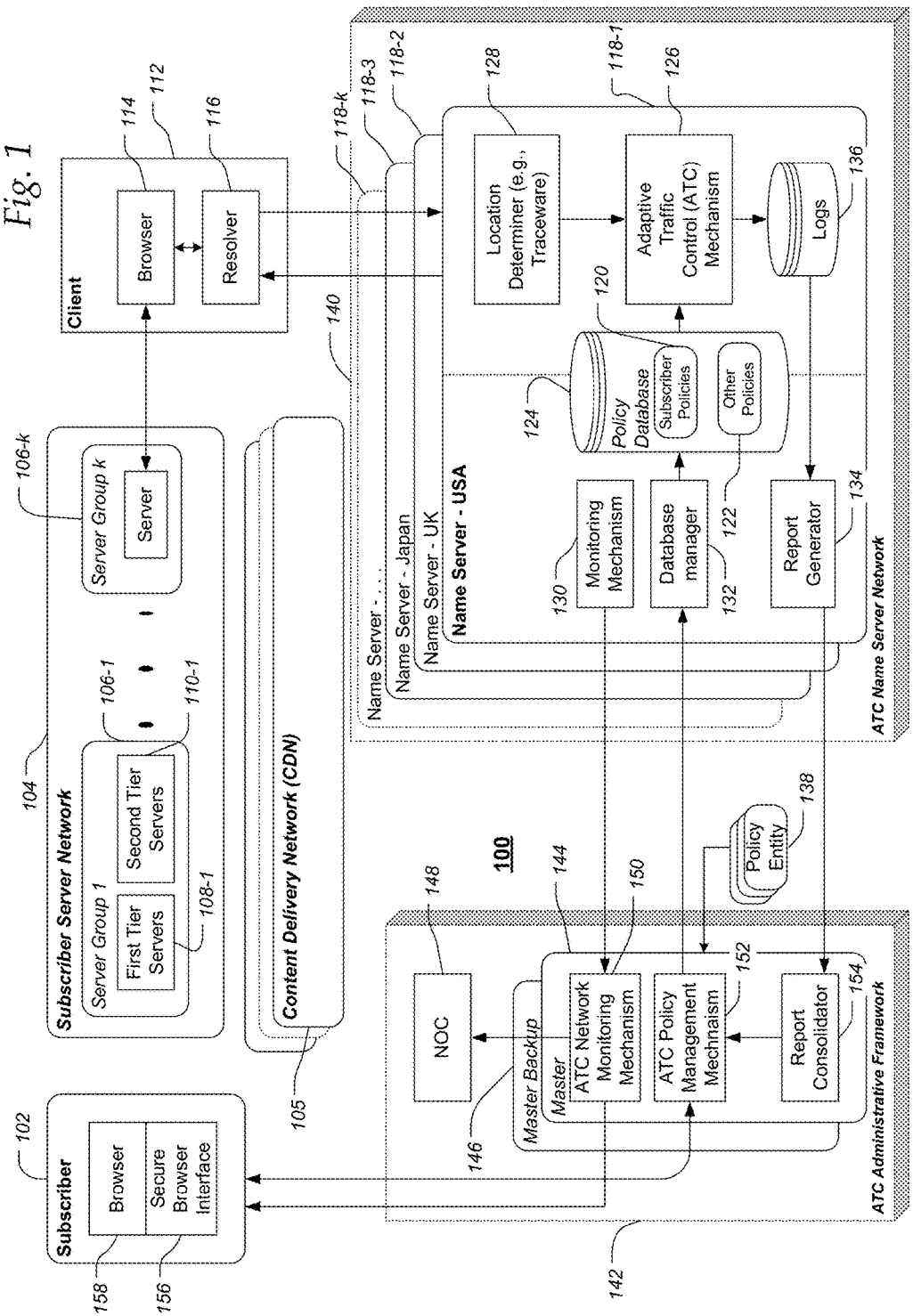
FIG. 1 depicts a framework according to embodiments of the present invention.

FIG. 1 depicts a high-level of a framework or system 100 according to embodiments of the present invention. A subscriber 102 provides content via a subscriber server network 104 which is made up of one or more server groups 106-1, . . . , 106-k (collectively 106).

As used in this description, the framework according to embodiments of this invention contemplates three groups of users:

An end-user who wishes to access content and/or applications over the Internet.

An operator who offers and supports the service on a managed network of computers.

A subscriber (typically a content or applications provider) who subscribes to the operator's service to help to support the needs of the end user.

The terminology end-user, operator and subscriber is used throughout this description to distinguish these three roles, although there are many scenarios in which more than one role can be taken by a single entity. Such scenarios are contemplated by this invention.

Each server group 106 may correspond to a server hierarchy which includes one or more tiers of servers. For example, the first tier of a server hierarchy may comprise one or more primary servers and the second tier of the server hierarchy may comprise possibly one or more overflow servers that are used when the primary servers in the first tier fail to function properly. In general, for the j-th server group, the primary servers at the first tier of server group 106-j are denoted 108-j, and the overflow servers at the second tier of server group 106-j are denoted 110-j.

Each server in a server group is any process or collection of processes that provide resources in response to requests, e.g., from a client. A server can be any off-the-shelf Web server. In some embodiments, servers are typically a Web server such as the Apache server or Netscape Communications Corporation's Enterprise™ server.

Client 112 accesses the subscriber server network 104 in order to obtain content from the subscriber. Content includes any kind of data, including, without limitation, video, and audio data and the like. To achieve this access, a user at client 112 enters a resource locator, e.g., a Universal Resource Locator ("URL"), into a browser 114 on client 112. URLs specify the location of resources (information, data files, etc.) on the network. URLs are defined in detail in T. Berners-Lee et al, Uniform Resource Locators (URL), Network Working Group, Request for Comments: 1738, Category: Standards Track, December 1994, located at "http://ds.internic.net/rfc/rfc1738.txt", which is hereby incorporated herein by reference. URLs generally have the following form:

scheme://host[:port]/url-path where "scheme" can be a symbol such as "file" (for a file on the local system), "ftp" (for a file on an anonymous FTP file server), "http" (for a file on a Web server), and "telnet" (for a connection to a Telnet-based service). Other schemes can also be used and new schemes are added every now and then. The port number is optional, the system substituting a default port number (depending on the scheme) if none is provided. The "host" field (the hostname) maps to one or more particular network addresses for particular computer(s). The "url-path" is relative to the computer specified in the "host" field. A url-path is typically, but not necessarily, the pathname of a file in a web server directory.

The framework or system 100 includes at least one Domain Name Service (DNS) name server 118-1. In preferred embodiments, the system 100 also includes DNS name servers 118-1, 118-2, . . . , 118-n, (collectively referred to as name servers 118) all operated by a single particular entity. In the embodiment shown in FIG. 1, one of the name servers 118-1 serves the U.S.A., another name server 118-2 serves the U.K., another name server 118-3 serves Japan, and so on. The various name servers 118-1, 118-2, . . . , 118-n can be configured (collectively or individually) to serve geographical regions, geopolitical regions, corporate structures, or any other logical organizational structure. The structure and operation of each name server 118 is described below.

When the client's browser 114 obtains a request (e.g., in the form of a URL), the browser queries its resolver 116 for an address for the hostname specified in the requested URL. The resolver 116 eventually queries a particular name server (e.g., name server 118-1). The name server 118-1 returns (provides or attempts to provide) the IP (Internet Protocol) address (or addresses) of a server (or servers) in the subscriber server network. The determination of the particular IP address returned to the resolver 116 may be based on a number of factors, including the resolver's location (e.g., as determined from the resolver's IP address) and various policies (e.g., subscriber policies 120, other policies 122) in a policy database 124. The client's browser 114 is then able to communicate with the selected server in the subscriber server network in order to obtain the desired resource.

Name servers 118-1, 118-2, . . . , 118-n, according to embodiments of the present invention, include an adaptive traffic control (ATC) mechanism 126 which provides domain name service to a client based on policies in the policy database 124. Each name server 118 includes or has access to a location determination mechanism 128 for associating the client's request with the client's location. Such a mechanism 128 may be, e.g., the TraceWare™ product of Cable & Wireless PLC. TraceWare™ is suite of services which provide an Internet Atlas which gives real-time, geographic intelligence through its ability to recognize the originating country, region, and metropolitan area of Internet consumers.

The subscriber server network 104 represents a network of servers that provides, on behalf of an underlying subscriber, Internet content or services. For example, a subscriber may be a content provider, which has its own network of servers that deliver content to end users' browsers via the Internet. The subscriber server network 104 may be configured in such a way that the processing of the service requests may be reasonably distributed among all the servers in the server network 104, according to some criteria. To achieve that distribution, the subscriber server network 104 may be organized, for example, to have one or more server groups (e.g., server group 1 106-1, . . . , server group k 106-k), each of which may be responsible for processing a portion of the service requests. For example, service requests coming from Finland may be routed to a server group that is physically located in Europe.

Each server group 106 in the subscriber server network 104 may comprise a plurality of servers to further share the load. For example, a service request from Finland may be subsequently routed to a server located in Scandinavia. Routing service requests to different server groups and subsequently to different servers may be based on various criteria. For example, such routing may be based on the distance between the origin of the request and the location of the server. For example, for a service request originated from Finland, it may be more effective and efficient to direct the request to a server located in Norway instead of directing it to a server located in the U.S. Server load may also be used to determine where to route a service request. For example, a service request originated from the U.S. may be routed to a server group in Mexico if the server group in the U.S. is overloaded while the server group in Mexico is relatively idle.

Servers in a server group may be organized into a hierarchy with one or more tiers of servers. Servers at different tiers may have different designated purposes. For instance, servers at the first tier of a server hierarchy may include servers that are primary functioning servers, servers at the second tier may include servers that are used as overflow servers which become active only when the primary servers at the first tier become unavailable or overloaded, and servers at the third tier that are used as second layer overflow servers that become active only when the primary servers and the overflow (or first layer overflow) servers at the second tier become unavailable or overloaded, etc.

The first tier of a server group hierarchy may include one or more primary servers. When multiple primary servers are present, they may be configured in such a way that they share the load. For example, if there are five primary servers at the first tier, they may be configured so that each takes 20% of the total service requests routed to the server group. For each of such primary servers, it may be further configured so that when a particular server is overloaded or fails, the load share originally designated to this server may be shed or directed to other server(s). The load shed may also be configured when the server is not overloaded. The portion to be shed to other server(s) may be governed by certain pre-defined policies.

As discussed above, servers in a server group 106 may be classified into different categories based on specific functionality of the underlying servers. For example, a server in a server group 106 may be a primary server, a first layer overflow server, or a second layer overflow server, etc. A server may also be classified in terms of whether and how a server is to be dynamically monitored. For instance, in some embodiments, a server can be classified as either a monitored server or a managed server.

A classification of a monitored server indicates that the underlying server is to be monitored dynamically for its availability. In this case, the server may be probed for its availability according to some pre-determined schedule. Such a probe may be sent to the underlying server from different locations of the network so that the availability can be detected accurately. That is, if the underlying server failed to respond to one probe sent from one location, it does not necessarily indicate that the server is no longer available (could be due to that only part of the network is congested).

A probe can be realized in different fashion. It can be simply a signal sent to the server to request an acknowledgement. It can also be a poll operation in which a file stored at a designated location on the underlying server is polled. If the file can be successfully polled, the underlying server is considered to be available. The detected availability may be used to adjust or update policies associated with the server so that the network traffic management will respond to the dynamics related to the server.

A server that is classified as a managed server may be actively participating the adaptive policy-based management scheme. Similar to a monitored server, a managed server may be regularly probed for its availability. In addition, a managed server may dynamically provide information related to its load share or load shed. A managed server may update its load share or load shed fraction according to its changed capacity or its current load. For example, when a managed server is upgraded, its capacity may be increased so that it may increase its load share or decrease its load shed fraction. On the other hand, when a managed server is overloaded, it may revise its load share to a lower level or increase its load shed fraction to prevent failure. A managed server may revise its load share or load shed by updating the corresponding load share or load shed information in a designated file stored on the server and this file may be polled by a name server so that the dynamically changed load share and load shed information can be used to direct traffic accordingly.

The distribution of service requests (from a client 112) within the subscriber server network 104 may be controlled through a set of ATC policies (120, 122) stored in the policy database 124. Various authorities may influence the ATC policies and may create policies in the policy database 124. For example, the subscriber may set up policies to direct traffic with respect to considerations such as the geographical locations and the capacities of the underlying servers in the subscriber's network 104. Other policy entities 138, including, for example, the operator of the name servers 118 or various geo-political entities may also have policies regarding how the network traffic should be managed and directed. For example, governmental or some organizational agencies may regulate some aspects of network traffic policies. Such regulation policies may be required to be incorporated so that a service request from the client 112 can be routed in a manner that satisfies regulatory policies.

Thus, the ATC policies in the policy database 124 may be a combination of subscriber policies 120 and other policies 122 from different sources such as subscriber 102 and policy entity 138. Policies from different sources may be accessed by the ATC mechanism 126 from the policy database 124. From the point of view of the ATC mechanism 126, the source of a policy may not be relevant or even determinable. For example, policies may be defined in a textual file stored at a designated location, which may be downloaded to an ATC policy management mechanism 152 in an ATC administrative framework 142 and then broadcast to the database manager 132 located in each of the name servers in the ATC name server network 140. The download may be via either a graphical user interface (GUI), a file transfer protocol (FTP), or some other mechanism. Policy makers may also enter policies directly via a web-based GUI. For example, the subscriber 102 may enter subscriber policies 120 via a browser interface 156 connected with the ATC administrative framework via, preferably a secure interface (e.g., implemented using the "https" protocol).

Figure 2:
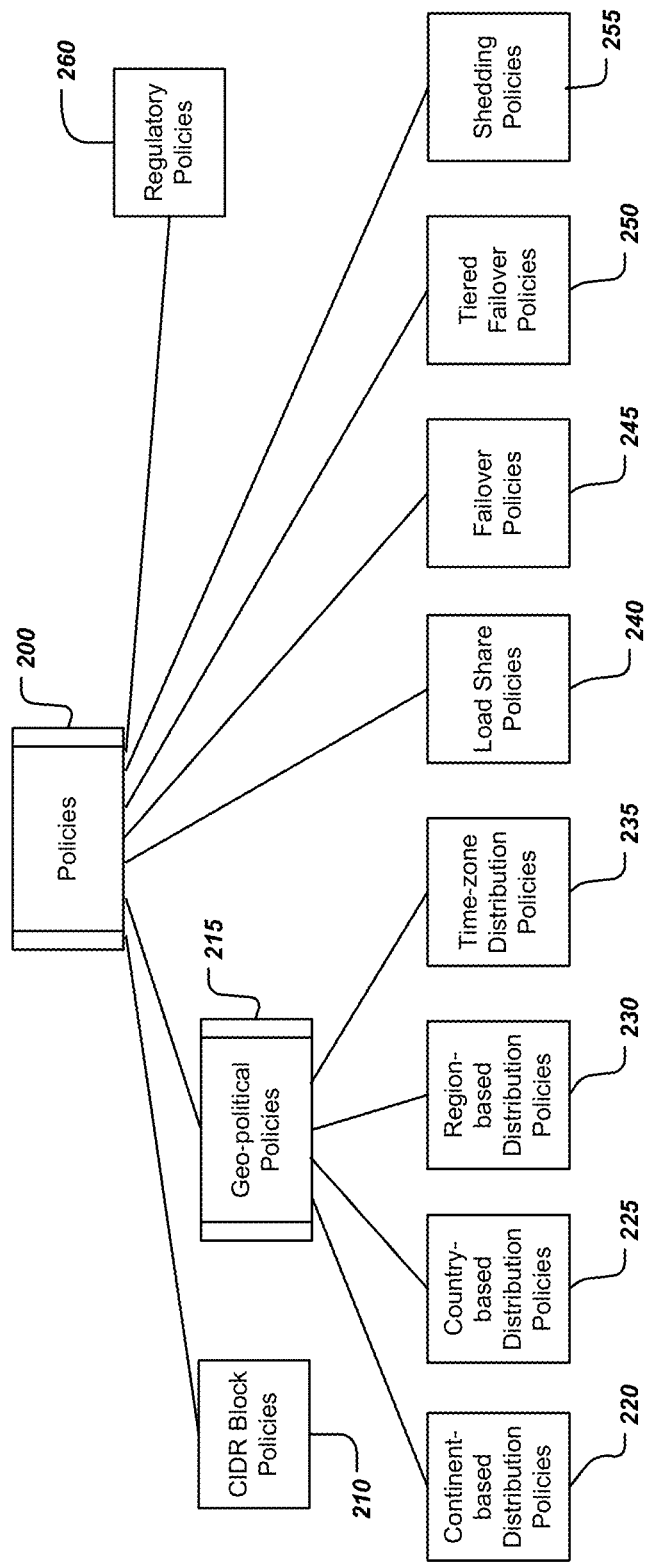
FIG. 2 describes exemplary types of policies, according to embodiments of the present invention.

The policies from the policy database 124 used by the ATC mechanism 126 are collectively referred to as ATC policies, which may include, not is not limited to, the subscriber policies 120 as well as other policies 122. The ATC policies may be organized in a manner that is appropriate to govern and/or control the traffic at different levels of the subscriber server network 104. FIG. 2 shows exemplary types of ATC policies 200 according to embodiments of the present invention.

The ATC policies (200) may be classified into different types such as geo-political policies 215, load share policies 240, failover policies 245, tiered failover policies 250, shedding policies 255, regulatory policies 260, and Classless Inter-Domain Routing (CIDR) block policies 210.

These exemplary policies in the policy database 124 are described in greater detail below:

Geographic Policy (215): Decisions are based on location of the end-user or an approximate thereof, e.g., using the IP address of an end-user's resolver. For example, if the IP address is within the U.S., the request may be directed to a "domestic" group of servers in the subscriber server network 104, otherwise it may be directed to "international" servers in the network. The request may be directed to a proprietary Content Delivery Network (CDN) or to another service specified by the subscriber.

Load Share Policy (240): The subscriber can explicitly specify the amount of traffic (load share) to be directed to each of their servers within a defined server set in the subscriber server network 104. Typically the load may be specified according to the capacity of each server. Based on such specification, the load share of each server may be derived as a percentage of the total load.

Failover policy (245): The subscriber may specify policies regarding a failover situation where some of the primary servers fail to function. To take care of such a scenario, a failover policy may instruct the ATC mechanism in terms of, for example, how often to monitor the availability of the servers and what strategy to adopt when a partial set of the primary servers are detected to be unavailable. For instance, a failover policy may specify to distribute the load of a failing server to other primary servers. It may also alternatively instruct the ATC framework to direct traffic to servers other than the primary servers.

Tiered Failover Policy (250): The subscriber may specify a strategy through tiered failover policies by which the load should be re-directed to servers at a next tier when one or more subscriber servers in a previous tier fail to function. For example, in defining the subscriber server network, each server group may be configured as a hierarchy, having the first tier of primary servers, the second tier of first layer overflow servers, and the third tier of second layer overflow servers, etc. In this case, a tiered failover policy may be defined to indicate when the load should be re-directed from the primary servers to the overflow servers. For instance, a tiered failover policy may indicate that when all the primary servers fail, the load should be directed to the second tier, and when servers at both the first tier and the second tier fail, the load should be directed to the overflow servers at the third tier. The traffic may also be re-directed to some other servers. For example, when a content delivery network (CDN) is available, the traffic may be re-directed to the entire CDN.

Shedding Policy (255): In some circumstances, a fraction of the "load" originally designated to a server may be shed or re-directed to one or more different servers. This may occur when the amount of traffic directed to the subscriber server exceeds a prescribed level. In these cases, a subscriber-specified fraction of traffic (shed fraction) that would otherwise be directed to the server may be shed to one or more other different servers. Such strategy may be adopted to prevent catastrophic failure due to overload. The servers that take the shed load may be an overflow server or some other servers such as a content delivery network. An overload situation may be detected according to the response time of the server. For example, if the response time from a server becomes long, it may indicate that the server is overloaded. In this case, shedding policies 255 may be invoked to re-direct the traffic elsewhere. For instance, if there are a total of 3 primary servers in a server group with load share of (0.3, 0.3, 0.4) and the primary server that is designated to take 40% of the total load is completely overloaded, a shedding policy may specify to shed the load of this server by re-directing 50% of its original load to, for example, the servers located in the CDN 105. A shedding policy may also specify a condition upon which the traffic will be directed again to the shedding server. Such a condition may relate to a desirable level of performance of the shedding server.

CIDR Policy (210): Policy decisions are supported based upon CIDR blocks of IP address space. CIDR denotes Classless Inter-Domain Routing, an IP addressing scheme that replaces the system based on classes A, B, and C. With CIDR, a single IP address can be used to designate many unique IP addresses.

Regulatory policy (260): Certain policies may be specified by some policy entities to control network traffic. Such policies may be enforced in system 100.

A policy may be static or dynamic. Selection of a server from the subscriber server network 104 may be based on an adaptive, regularly updated map of the state of the Internet as well as adaptively updated policies. The map may cluster IP addresses together according to their network latency to a selected set of network agents. This enables the subscriber servers to be selected according to their "network proximity" to an end user's browser, optimizing resulted download time. The policies may be defined in such an adaptive manner that they reflect the dynamic status of the servers such as the availability and load.

Geo-political policies 215 may govern the selection of a server according to where the client is located. As shown in FIG. 2, the geo-political policies 215 may be further classified into continental based distribution policies 220, country based distribution policies 225, region based distribution policies 230, and time zone based distribution policies 235. These policies may be set up to govern the process of selecting a particular server group according to different geographical or political criteria.

Geo-political policies differ from load based policies (described above). The former is designed to guide selections based on geographical criteria or time criteria. The latter concerns the selection process with respect to the dynamic capacity and load of the underlying servers. The load share policies 240 govern the selection according to the capacities of the servers. Partial failover or tiered failover policies (245 and 250) govern the traffic re-direction process when functioning servers in a server group are overloaded or failed.

Figure 3:
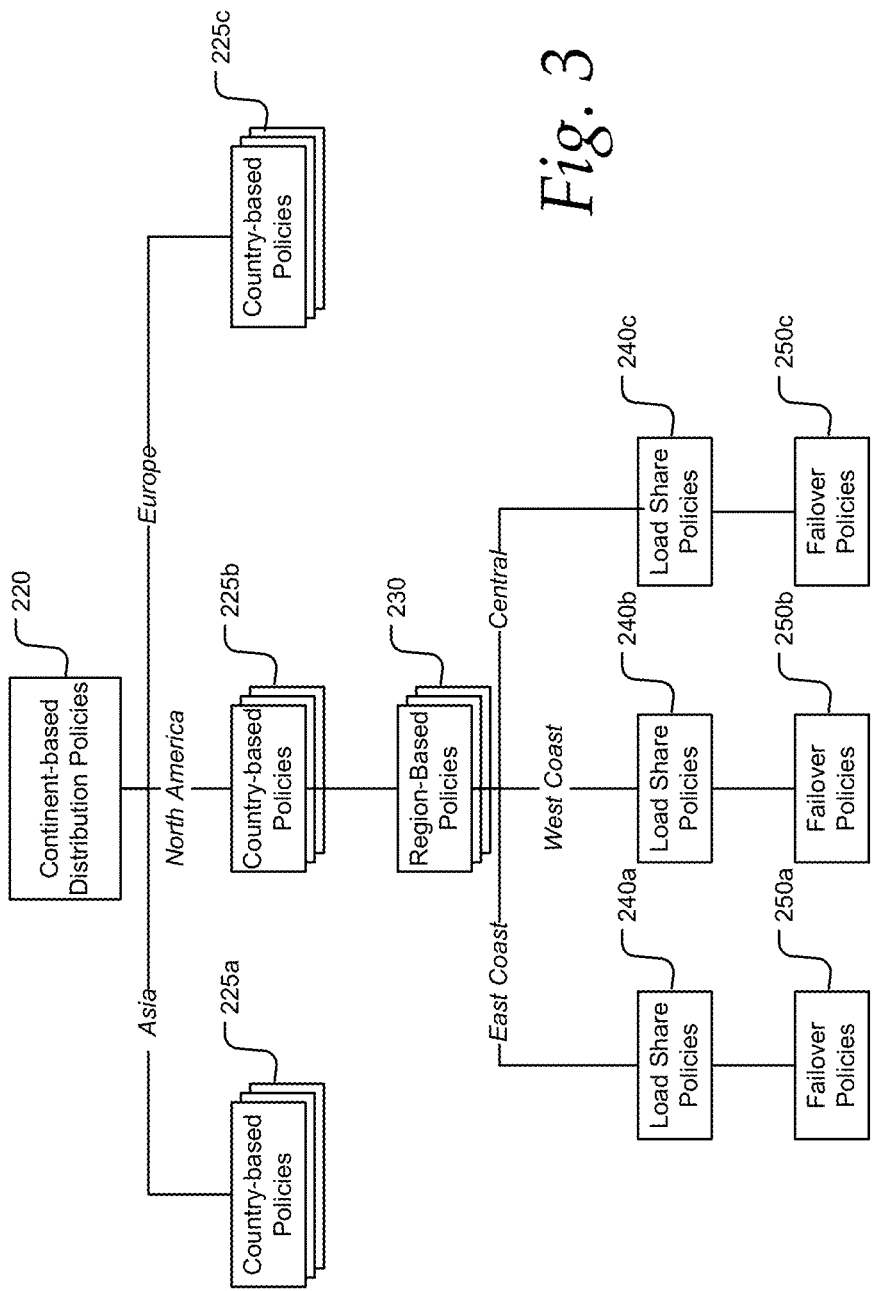
FIG. 3 shows an exemplary hierarchy or a decision tree built based on subscriber policies, according to embodiments of the present inventions.

The ATC policies 200 may be hierarchically constructed to form a decision tree. FIG. 3 depicts an exemplary subscriber policy hierarchy or a decision tree built based on various types of subscriber policies, according to an embodiment of the present invention. In FIG. 3, the continental based distribution policies 220 are used to first direct a selection process limited to a particular continent. For example, if the requesting client 112 is located in Asia, the continental based distribution policies 220 may direct the further selection within servers that are located in Asia. Similarly, if the client 112 is located in either North America or Europe, the further selection process may be directed to the appropriate servers located in the corresponding continent.

Once a DNS request is directed to an appropriate continent, the country based distribution policies 225 may further constrain the selection to particular servers that are in the same or close-by countries where the client 112 is located. For example, if the client 112 is located in the U.S., the country based policies 225 may direct the selection from the servers located in the U.S. Similarly, the region based distribution policies 230 may further constrain the selection to, for example, the west coast or east coast depending on where the client 112 is located.

When a particular server group is selected (e.g., after a hierarchical decisions based on the continent-based policies 220 and the region-based policies 230), the load share policies 240 govern the process whereby servers in a given server group should be selected. Such policies may be determined based on the servers' capacities or may be adaptively revised based on the dynamic performance or load of the underlying servers. The load share policies 240 may specify the percentage (share) of the total requests that each server in a server group should handle. For example, if a server group comprises a total of three primary servers (server 1, server 2, server 3), a load share policy for this server group may specify the load share as (0.3, 0.5, 0.2), indicating that server I should take 30% of the total load, server 2 should take 50% of the load, and server 3 should take 20% of the total load.

The tiered failover policies 250 govern the selection of a server when a particular default set of servers is no longer functioning or available. For example, primary servers in a server group may be considered as a default set of servers that provide service when operation is normal. Unavailability of such primary servers may be detected according to the response time of the server. For example, if a server is simply not responding, the server may be considered as not available. When all the primary servers are down, the tiered failover policies 250 govern where the traffic should be directed. For instance, the tiered failover policies 250 may specify to direct all traffic to the overflow servers at the next tier.

Figure 4:
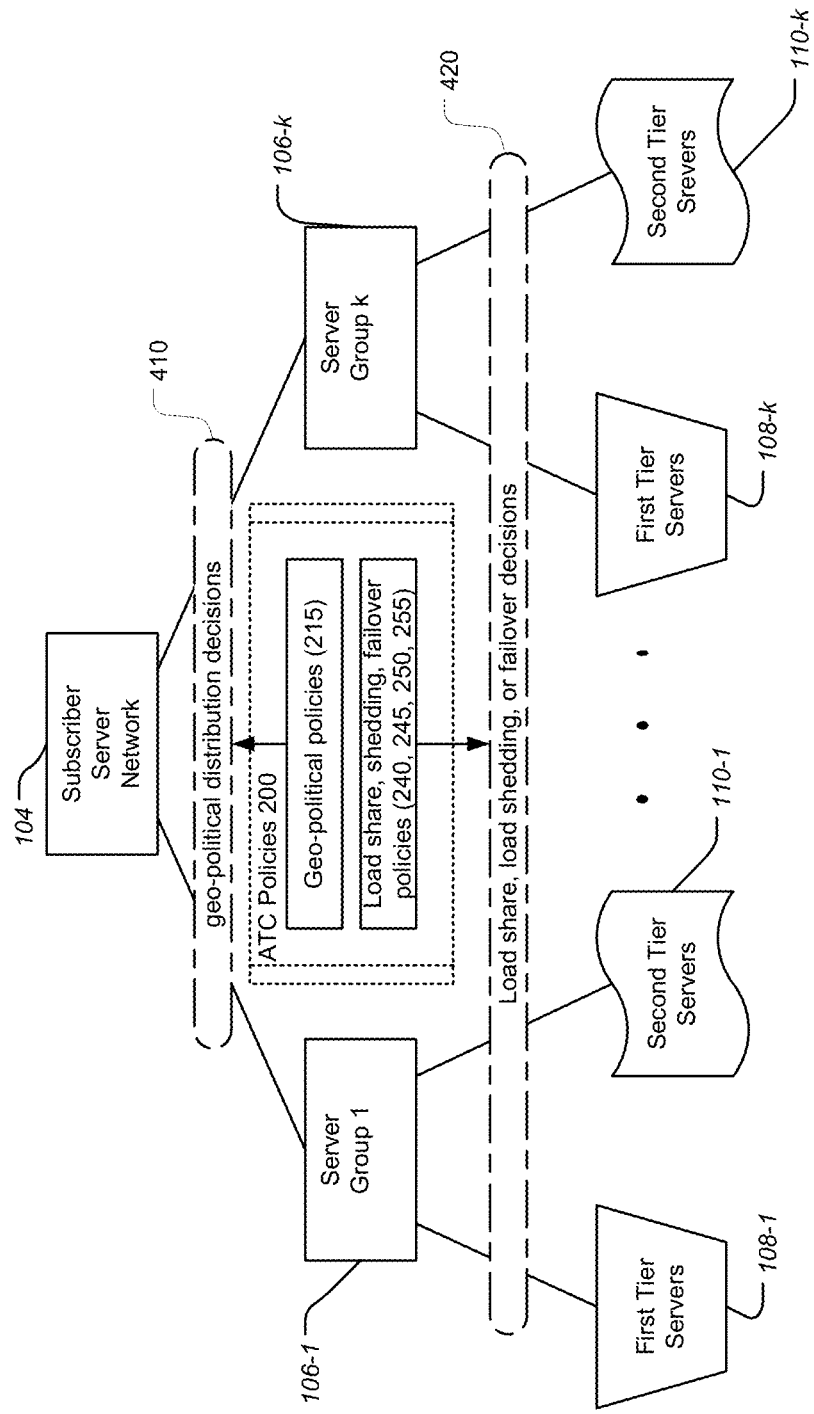
FIG. 4 shows an exemplary relationship between a subscriber's network hierarchy and subscriber policies, according to embodiments of the present invention.

FIG. 4 depicts an exemplary relationship between the subscriber server network 104 and the subscriber policies 120, according to embodiments of the present invention. The subscriber server network 104 is depicted in FIG. 4 as a network hierarchy or a tree in which the subscriber server network 104 includes server group 1 106-1 through server group k 106-k, and each server group may include its own primary server group 108 in the first tier and overflow server group 110 in the second tier (e.g., server group 1 106-1 has primary server group 108-1 and overflow server group 110-1 associated therewith, while server group k 106-k has primary server group 108-k and overflow server group 110-k associated therewith).

The subscriber policies 120 govern selection of one or more servers within the subscriber server network 104 (or in some other network of servers) so that their IP addresses may be returned in response to DNS requests from the client 112 (resolver 116). To determine or to select appropriate servers in the subscriber server network 104, the decisions may be hierarchical. For example, as shown in FIG. 4, at the level of the subscriber server network 104, the ATC mechanism 126 may make geo-political distribution decisions 410 to determine which server group should be selected. Once a particular server group is selected, the ATC mechanism 126 may further determine which particular servers in the group should be selected according to, for example, how the traffic load should be shared among the servers within the server group. Decisions at server group level may be based on the load share policies 240. This decision making process illustrates that, at each branch node in the server hierarchy, appropriate ATC policies may be applied to govern the selection of an appropriate server or servers.

As illustrated in FIG. 4, the geo-political policies 215 may be applied to control the selection of a particular server group, the load share policies 240, the tiered failover policies 245 and 250, and the shedding policies 255 may be applied to re-direct traffic. That is, the subscriber server network 104 forms a tree and the ATC policies 200 govern the flow from the top of the tree to one or more leaves of the tree. The ATC mechanism 126 controls the flow by applying the ATC policies 200.

Figure 5:
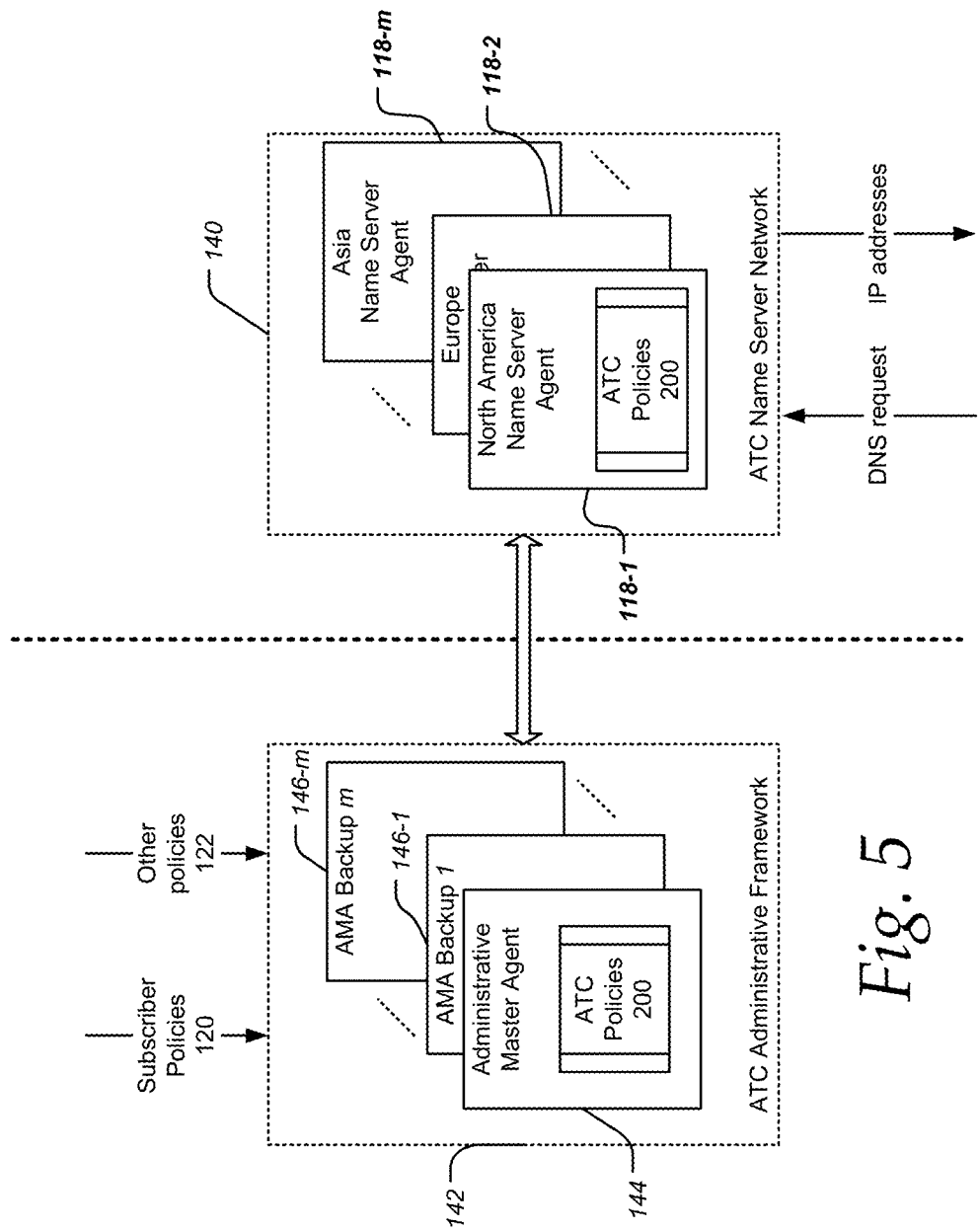
FIG. 5 depicts a high level architecture of an adaptive traffic control framework according to embodiments of the present invention.

FIG. 5 depicts a high level architecture of an adaptive traffic control (ATC) framework according to embodiments of the present invention. The ATC framework comprises an ATC administrative framework 142 and an ATC name server network 140. The ATC administrative framework 142 is responsible for various administrative tasks associated with subscribers or other policy making entities (138), include manipulating and storing the ATC policies 200, propagating or broadcasting the ATC policies 200 to name servers in the ATC name server network 140, monitoring name server behavior, generating status reports to display monitoring results on appropriate media, and sending alert to a network operation center (NOC) 148 (see FIG. 1) and the subscriber 102.

The ATC name server network 140 is responsible for responding to DNS requests, including processing DNS requests, applying the ATC policies 200 to select one or more servers from the subscriber server network (or a different designated network), and replying with the IP address(es) of the selected server(s). The ATC name server network 140 dynamically maintains the ATC policies 200, that are either received from the ATC administrative framework 142 or updated according to the dynamic operational status of the servers. The ATC name server network 140 provides domain name-IP address resolutions based on dynamically updated ATC policies 200. The ATC name server network 140 may also monitor the operational status of individual name servers within the network and supply logging and monitoring data to the ATC administrative framework 142.

The ATC administrative framework 142 may be designed to have fault-tolerance. For example, as depicted in FIGS. 1 and 5, the ATC administrative framework 142 may include an administrative master agent (AMA) 144, and one or more AMA backups 146-1, . . . , 146-*m* (collectively 146). All AMA agents, including the master agent 144 and the backups 146 may be capable of performing the exact functions except that one of them (e.g., master AMA 144) may be a central or primary administrative master agent and others (e.g., AMA backups 146) may be backup or secondary or redundant master agents. The central or primary AMA 144 may be responsible for regularly backing up the AMA backup agents 146. When, for whatever reason, the primary AMA 144 is no longer functioning properly, one of the AMA backups 146 may take on the role of the central or master AMA 144.

The ATC name server network 140 may comprise a plurality of name server agents 118-1, 118-2, . . . , 118-*k*, each of which maybe designed to be responsible for the DNS requests of a particular geographical (or any other administrative or functional) region. For example, the name server agent 118-1 may be responsible for processing all the DNS requests from North America, the name server 118-2 may be responsible for Europe's DNS requests, and the name server 118-3 may be responsible for DNS requests from Japan. In addition, a name server agent may also serve as a back up name server agent for other name server agents in the network. For example, if the North America name server agent is not functioning properly, the Europe name server agent may be temporarily assigned to handle the DNS requests from North America. For that purpose, all ATC policies may be propagated to all of the name server agents in the ATC name server network 140.

Figure 6:
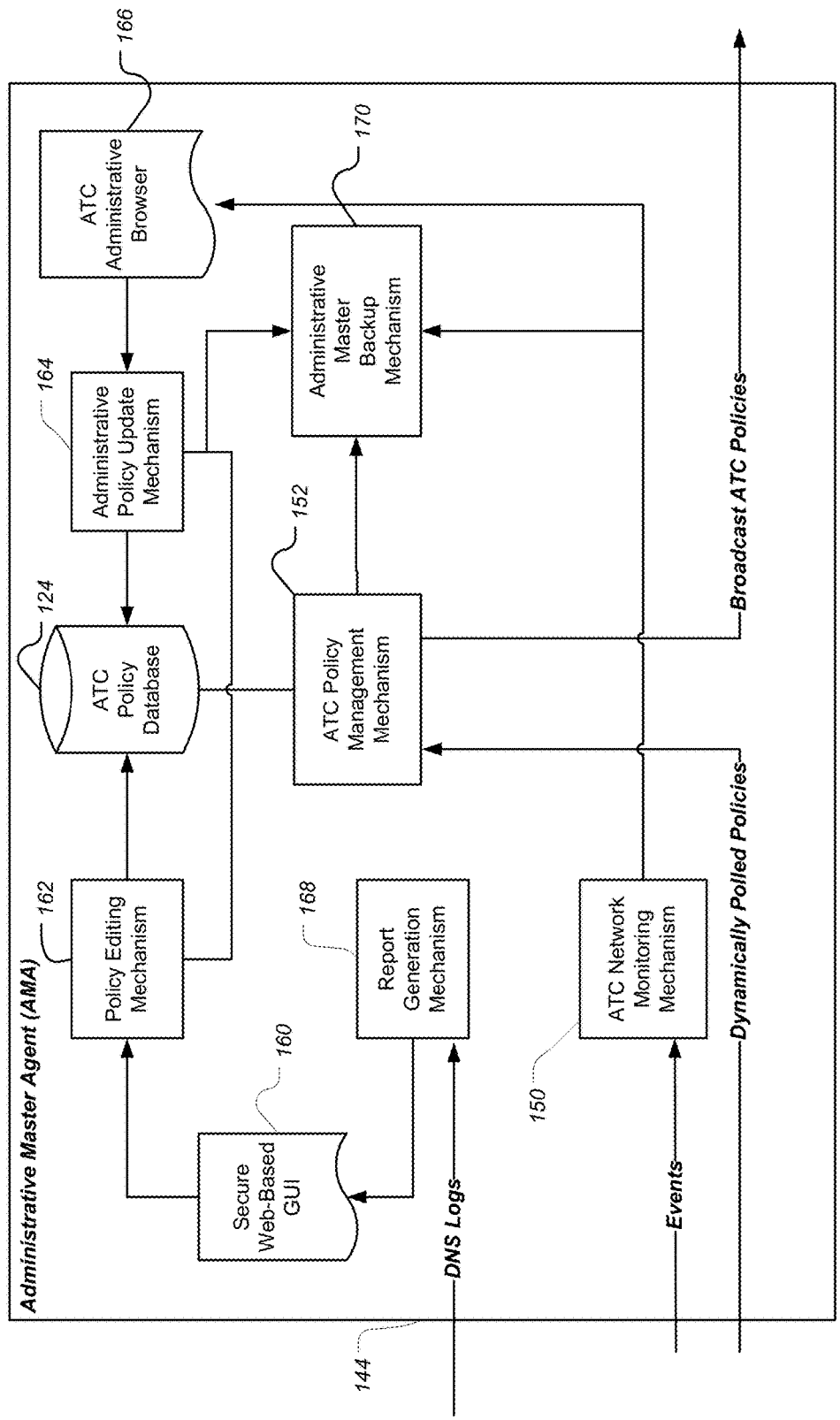
FIG. 6 depicts a high level functional block diagram of an administrative master agent (AMA) according to embodiments of the present invention.
Figure 8B:
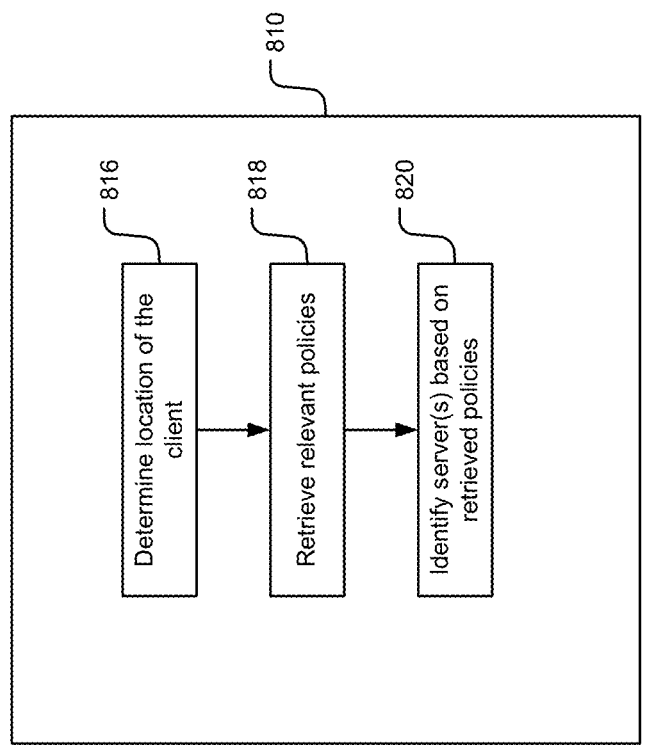
FIG. 8(b) is an exemplary flowchart of a process, in which a domain name server resolves a hostname based on policies, according to embodiments of the present Invention.
Figure 8C:
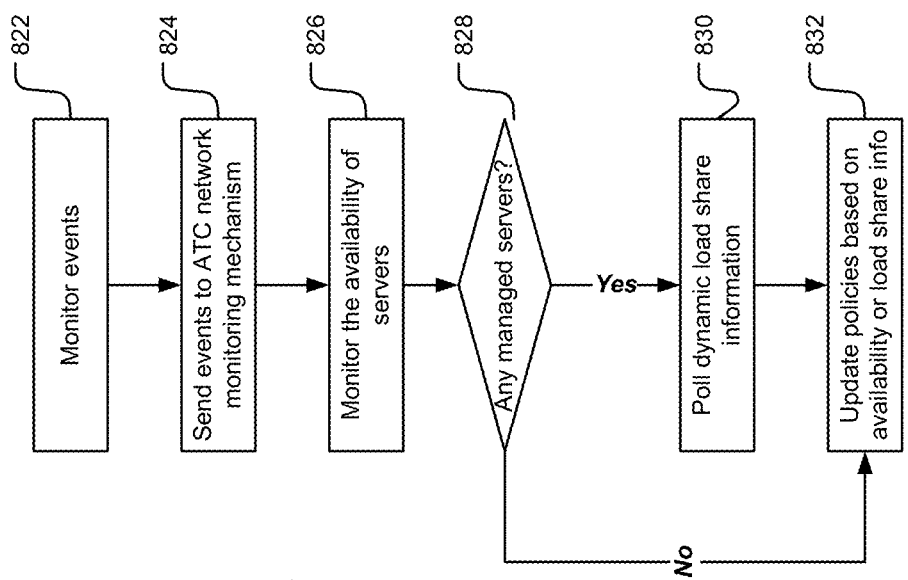
FIG. 8(c) is an exemplary flowchart of a process, in which a monitoring mechanism of a domain name server dynamically monitors the name service operations as well as the availability and the load share status of servers, according to embodiments of the present invention.
Figure 8D:
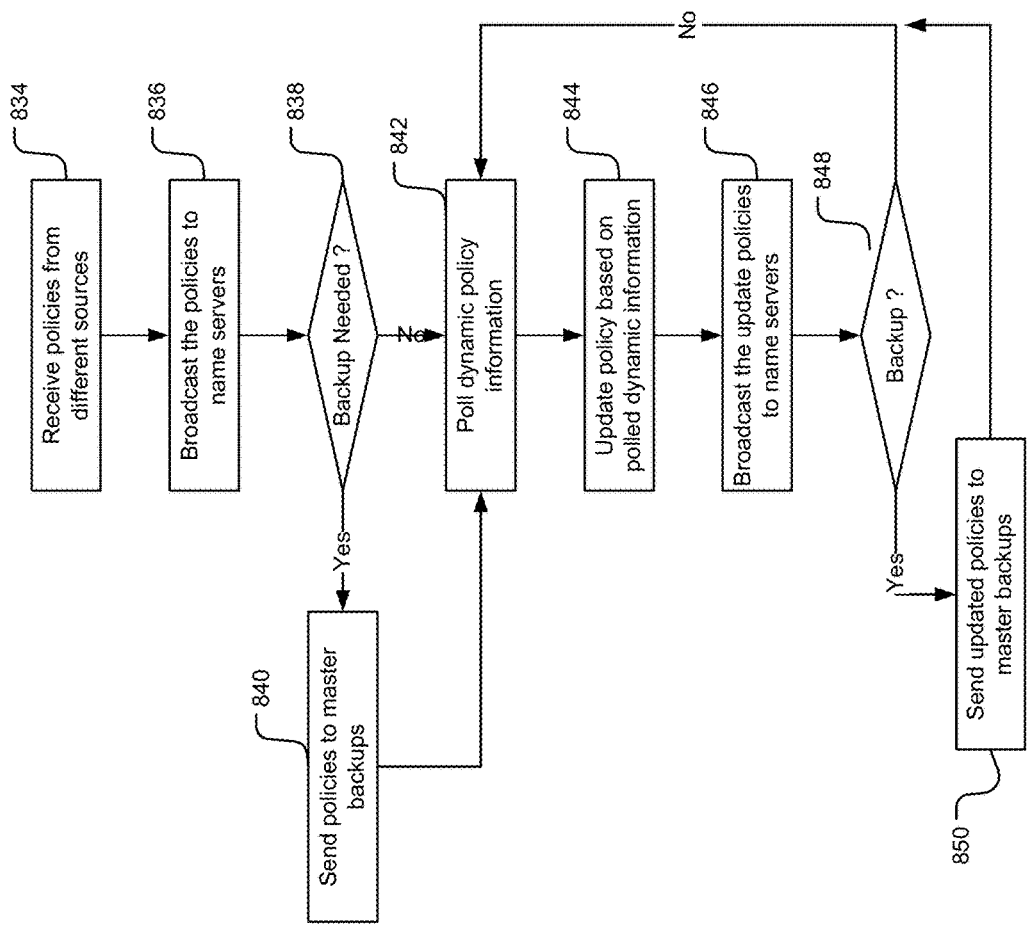
FIG. 8(d) is an exemplary flowchart of a process, in which an ATC administrative network maintains dynamic policies and monitors the operations of a content delivery framework, according to embodiments of the present invention.
Figure 8E:
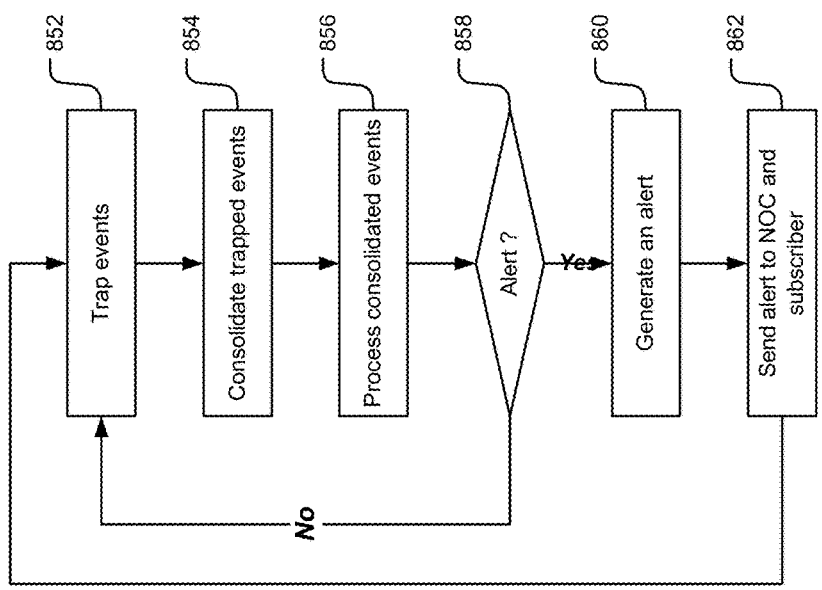
FIG. 8(e) is an exemplary flowchart of a process, in which an ATC network monitoring mechanism traps events from different domain name servers and generates alerts when necessary, according to embodiments of the present invention.

FIG. 6 depicts a high level functional block diagram of an administrative master agent (AMA) 144 according to embodiments of the present invention. The AMA 144 comprises a secure web-based graphical user interface 160, a policy editing mechanism 162, an ATC policy database 124, an administrative policy update mechanism 164, an ATC administrative browser 166, an ATC policy management mechanism 152, a report generation mechanism 168, an ATC network monitoring mechanism 150, and an administrative master backup mechanism 170.

The ATC policy database 124 stores the ATC policies 200. As discussed above, the ATC policies 200 may include policies from different sources (e.g., from subscribers and from other entities that control network traffic). Both the subscriber policies 120 and other policies 122 may be defined and provided to the AMA 144. In the exemplary configuration shown in FIG. 6, the policies may be received at the AMA 144 through the secure web based GUI 160. There may be other means through which the policies can be delivered to the AMA 144 and will be discussed later. The policy editing mechanism 162 organizes the received policies to form the ATC policies 200 and then stores them in the ATC policy database 124.

The ATC policy management mechanism 152 may broadcast or propagate the ATC policies 200 to relevant name servers in the ATC name server network 140 so that the ATC policies 200 may be used to control the domain name translation service. The stored ATC policies may be dynamically updated via different means. For example, the policies may be updated through the ATC administrative browser 166, or the administrative policy update mechanism 164 may revise existing ATC policies.

Alternatively, the AMA 144 may also be provided with policies from different sources through the ATC policy management mechanism 152, which may regularly poll dynamically updated policies from different locations. Such locations may include designated network locations that are designated to provide dynamic policy related information or servers (either in the subscriber server network 104 or in the CDN 105) that are classified as managed servers. For instance, a server may dynamically specify its load share via a designated file stored on the server. To retrieve such dynamically defined load share information from a managed server, the ATC policy management mechanism 152 may poll the designated file stored on the managed server to obtain relevant load share information. Dynamic policies may also be polled from other policy making entities.

Broadcasting ATC policies may take place periodically according to some pre-defined interval or may be triggered whenever the stored ATC policies are updated. The ATC policy management mechanism 152 may monitor changes made to the existing ATC policies. The ATC policy management mechanism 152 may poll the ATC policies stored in the ATC policy database and see whether there are changes. On the other hand, whenever the ATC policy management mechanism 152 polls dynamic policies from specified locations (such locations may be specified in existing ATC policies), it may determine whether the dynamically polled policies differ from existing ATC policies. In the event that updated policies are different from the existing ATC policies, the ATC policy management mechanism 152 may re-broadcast the updated ATC policies to the ATC name server network 140.

The ATC network monitoring mechanism 150 may collect DNS log summaries from different name servers in the ATC name server network 140. Such summary log data may be received in the form of events that provide information such as, for example, the number of requests directed to particular servers in a given time period. The ATC network monitoring mechanism 150 may collectively processes such DNS log summaries (or events) from the entire ATC system. The report generation mechanism 168 may generates monitoring status reports from these summaries and makes such reports available to the subscriber 102 via the secure web-based GUI 160.

The administrative master backup mechanism 170 may periodically update the AMA backups 146-1, . . . , 146-*m* to ensure that all the backup agents are current. This may include replicating the ATC policies, the operational status of various control mechanisms (including the ATC policy management mechanism 152), the policy editing mechanism 162, and the administrative policy update mechanism 164, and providing the up-to-date information to the AMA backups.

A major function of an administrative master agent is to manage the ATC policies, to make sure that updated ATC policies are supplied to the name server agents in the ATC name server network 140, to monitor the various name servers' performance, to generate dynamic monitoring status report of system performance, and to maintain a connection through which policies may be updated dynamically and monitoring report can be examined.

Information flagging system errors and other anomalous conditions is collected by the ATC network monitoring mechanism or agent 150. FIG. 7 depicts an internal functional block diagram of an ATC network monitoring mechanism 150, according to embodiments of the present invention. The ATC network monitoring mechanism 150 includes a trap handler 176, a processing mechanism 182, and an alert generation mechanism 184. The trap handler 176 traps events from the name servers in the name server network 140. The processing mechanism 182 analyzes both the collected trapped events, and, based on analyzed information, the alert generation mechanism 184 generates alerts when necessary, and reports such alerts to, for example, the ATC's network operation center (NOC) 148 and the subscriber 102 (FIG. 1).

The trap handler 176 further comprises an event receiver 178 that intercepts trap events from the name servers and an event consolidation mechanism 180 which may classify the trapped events and organize them in a reasonable and appropriate fashion. The processing mechanism 182 may process the consolidated events to identify useful or informative patterns which may be further used, by the alert generation mechanism 184 to identify problematic patterns which may significantly affect the system performance.

The Adaptive Traffic Control (ATC) framework according to the present invention may be deployed as a stand-alone service directing traffic solely to the subscriber's servers, in conjunction with another content delivery network (CDN) provider, or in conjunction with any other service.

Each domain name server in the ATC name server network 140 may include (FIG. 1) a location determiner 128, an adaptive traffic control (ATC) mechanism 126, a monitoring agent or mechanism 130, a database manager 132, and a report generator 134. When a name server (e.g., 118-1) receives a request from the resolver 116 of the client 112, the location determiner 128 determines the location of the resolver and sends such location information to the ATC mechanism 126. Based on the location information, the ATC mechanism 126 retrieves relevant ATC policies from the policy database 124 (e.g., the subscriber policies 120 or the other policies 122) and selects one or more servers in the subscriber server network 104 according to the retrieved relevant policies. The corresponding IP address(es) or the CNAME of the selected servers are then returned to the resolver 116.

The database manager 132 maintains the policy database 124. It received policies broadcast from the ATC policy management mechanism 152 in the ATC administrative framework 142 and populates the policies in the policy database 124. The ATC policies received from the ATC administrative framework 142 may also include information that defines or classifies servers in the subscriber server network 104 (or in the CDN 105). For example, some servers may be defined as monitored servers and some may correspond to managed servers.

When the database manager receives such information, it may inform the monitoring mechanism 130 of the classification of the underlying servers so that the monitoring mechanism 130 can monitor each server according to its status. When the ATC policy management mechanism 152 broadcasts updated policies, the database manager 132 accordingly updates the relevant policies stored in the policy database 124.

The monitoring mechanism 130 monitors the operational status of the name server 118-1 and one or more servers in the subscriber server network. It may collect events occurred in the name server 118-1 during operations and send such events to the ATC network monitoring mechanism 150 in the ATC administrative framework 142. On the other hand, it may also monitor the operations of various servers in the subscriber server group 104 (or in the CDN 105) according to how each server is defined (monitored or managed server).

If a server is defined as a monitored server, the monitoring mechanism 130 may dynamically probe the server (as discussed earlier) to determine its availability. If a server is defined as a managed server, the monitoring mechanism 130 may monitor its availability during operation. The monitoring mechanism 130 may also poll dynamic load share information from the server. When the monitoring mechanism 130 detects that a server is no longer available, it may inform the database manager 132 to create a local policy that indicate that the server is no longer available so that the ATC mechanism 126 can take into account when resolving a hostname.

When the monitoring mechanism 130 polls the dynamic load share information from the server, it may inform the database manager 132 to update the load share policies in the policy database 124 that are affected by the dynamics of the polled load share. For example, if three primary servers in a server group originally have load share (0.3, 0.3, 0.4) and the third primary server now changes its load share to 0.2, the database manager 132 may accordingly update the load share among these three primary servers into (0.4, 0.4, 0.2).

The report generator 134 generates reports related to the operations of the underlying name server based on log information 136 recorded. Such generated reports may be sent to a report consolidator 154 in the ATC administrative framework 142 so that reports from different name servers may be consolidated.

A subscriber may activate (turn up) the ATC system (DNS servers) in one of two ways: using a DNS CNAME or using NS delegation. Instead of using ATC to direct traffic for a single DNS hostname, the subscriber may have many different subdomains that it would like to direct to ATC. For example, the subscriber might want all downloads from dl.customer.com handled by ATC, together with all of its subdomains, but have all other domains that it controls, such as www.customer.com, resolved by its own name server:

dl.customer.com.ATC
   any.thing.dl.customer.com.ATC
   www.customer.com.not ATC
   customer.com.not ATC In this case, instead of adding the CNAME record in the subscriber's DNS zone file, it simply delegates the dl.customer.com. name to ATC via NS records in its zone file.

The delegation (using NS-records) method is presently preferred as it is more flexible and offers all of the reliability, scalability and flexibility of ATC. After the initial contact for delegation, a properly operating resolver making occasional queries will not contact the subscriber's own name server or name servers again. The result provides much better name resolution performance since the unnecessary overhead of routing each fresh DNS request through the subscriber's name server is eliminated. The CNAME method keeps the subscriber's own name server in the loop. That is, whenever the CNAME TTL expires, client resolvers will return to the subscriber's name servers to refresh the record.

For both CNAME and NS delegation methods, the procedure to turn off the ATC switch is the same—the subscriber edits its DNS zone files to remove the delegation authority to ATC. DNS requests will continue to be served in accordance with the subscriber's defined ATC policies until the TTL's have expired on the appropriate delegations.

The System in Operation

FIG. 8(*a*) is an exemplary flowchart of a process, in which a name server resolves a DNS request based on ATC policies, according to an embodiment of the present invention. First, a user enters a URL into the user's browser 114 (or into any application that accepts URLs as input and obtains the corresponding resource for the client) (at 802). The client's resolver 116 attempts to resolve the hostname of the URL in order to obtain an IP address of a server from which the resource identified by the URL can be obtained (at 804). The resolver 116 will be directed by the client's DNS (not shown) to a DNS Name Server 118 in the ATC name server network 134 (at 806). The resolver 116 provides the name server 118 with the hostname it is attempting to resolve.

The name server 118 receives the request to resolve the hostname (at 808) and determines one or more servers in the subscriber server network 104 or in the CDN 105 that can process the client's request according to the location of the resolver 116 as well as relevant ATC policies retrieved from the policy database 124 (at 810). Details of this operation are described with reference to FIG. 8(*b*). The IP address(es) of the selected server(s) are returned to the requesting resolver 116 (at 812). The browser 114 then connects to one of the servers (at 814) in order to obtain the requested resource.

FIG. 8(*b*) is a flowchart of an exemplary process, in which a domain name server selects one or more servers according to location of the client and relevant ATC policies. The location of the resolver 116 (or client) is first determined (at 816). Relevant ATC policies are then retrieved (at 818) from the policy database 124. One or more servers in either the subscriber server network 104 or the CDN 105 are selected according to the determined location of the client and the relevant ATC policies (at 820).

FIG. 8(*c*) is a flowchart of an exemplary process, in which the monitoring mechanism 130 in a domain name server monitors the operations of the name server as well as one or more servers in the subscriber server network 104 or the CDN 105. Events occurring during domain name service are monitored (at 822). Such events are sent to the ATC network monitoring mechanism 152 (at 824). In addition, the availability of the one or more servers are also monitored (at 826). Furthermore, if any of the one or more servers is defined as a managed server (determined at 828), dynamic load share information is polled (at 830). Both the availability information and the dynamic load share information (if any) are used to update some ATC policies that are local to the name server (at 832).

FIG. 8(*d*) is a flowchart of an exemplary process, in which the ATC policy management mechanism 152 dynamically maintains and broadcasts the ATC policies. Initially, policies from different sources are received (at 834) and broadcast to the name servers 118 (at 836). If backup is necessary (determined at 838), the ATC policy management mechanism 152 sends current policies to the master backup agents 146 (at 840).

The ATC policy management mechanism 152 also performs dynamic policy maintenance. It polls dynamic policy information (at 842) at certain defined intervals and uses such polled dynamic policy information to update existing policy (at 844). The updated policies are then broadcast to the name servers (at 846). If the updated policies need to be propagated to the backup agents (determined at 848), they are sent to the master backup agents (at 850).

FIG. 8(*e*) is a flowchart of an exemplary process, in which the ATC network monitoring mechanism 150 monitors operations of the name servers and sends alert to the NOC 148 and the subscriber 102. Events sent from monitoring mechanisms of different name servers are trapped (at 852). Such trapped events from different sources are then consolidated (at 854) and processed (at 856). If there is any alarming situation (determined at 858), the ATC network monitoring mechanism 150 generates an alert (at 860). The generated alert is then sent to both the NOC 148 and the subscriber 102 (at 862).

Policy Administration

The ATC policies may be initially set up and later adaptively updated according to servers' dynamic operational status. The ATC policies may be formed via various means. The described approaches may also be applied to form other policies. A GUI approach or a file-based approach (or both) may be employed to set up subscriber policies. Through the GUI approach, different means to form subscriber policies may be adopted. For example, a browser may be used so that a subscriber can enter policies directly. An XML file containing descriptions of the subscriber policies may also be loaded using GUI approach so that the policies may be parsed and stored. As another alternative, a file containing descriptions of the subscriber policies may also be loaded in a similar fashion and parsed accordingly. When a file based method is used, a file containing descriptions of the subscriber policies, either constructed based on XML or some other structure, may be accessed via other means such as FTP.

In some preferred embodiments, a subscriber accesses a secure web-based GUI 160 (FIG. 6) using subscriber's secure browser interface 156.

FIGS. 9(*a*)-9(*c*) show exemplary secure web based graphical interfaces, through which a subscriber may define load share policies and overflow policies with respect to specified network resources, according to embodiments of the present invention. There may be different types of load sharing servers: (1) static servers, (2) dynamic servers, and (3) overflow servers. A dynamic server is one that is specified as either a monitored or a managed server whose dynamic availability may be monitored and whose load may be re-directed when it becomes unavailable. In the case of a monitored server, both of its load share and load shed fraction may also be made dynamic.

Correspondingly, the policies governing routing requests to different types of servers may also be defined accordingly. First, the policies that govern static servers are applied when servers are relatively static and do not change often over time. This may mean that the availability of the servers is fairly stable and load sharing among different servers is also relatively stable. The policies that control dynamic servers are applied when servers are expected to change frequently. Such policies include failover policies, shedding policies, and tiered failover policies (described earlier). The overflow policies control the change of flow of the requests when, for some reason, primary servers, either static or dynamic, become unavailable or overloaded. In this case, relevant overflow policies determine to which overflow server a request for name service should be directed.

The load share with respect to a given server represents the amount of traffic that will be sent to that server within a static server setting. An exemplary method to compute the load share of the traffic sent to the server is to sum the load share amount of all servers in a current static server setting and divide the load share for that server by the summed total to derive the load share.

The shed fraction for a given server represents the percentage of traffic that should be redirected away from the server. The redirection may be carried out after load share is made based upon load share policies. FIG. 9(*a*) gives an example interface, in which each of the servers listed is assigned various selection related parameters. For example, for each server, a TTL is specified. In addition, a load share and a shed fraction may also be specified. For example, both server New York and London have load share of 1.0. The shed fraction assigned to server New York is 0.2, meaning that 20% of its load is re-directed to some other server, and the shed fraction assigned to server London is 0.3, meaning that 30% of its load is re-directed to some other server.

Shedding fractions may also be computed automatically on the fly. For example, when a server is detected to have slow response, indicating that it may be overloaded, a shedding fraction may be computed according to the discrepancy between its expected response time and the actual response time. Such an automatically computed shedding fraction can then be applied to re-direct the newly computed fraction of the traffic to a different server to unload some of the traffic originally intended to be directed to the overloaded server.

Figure 9A:
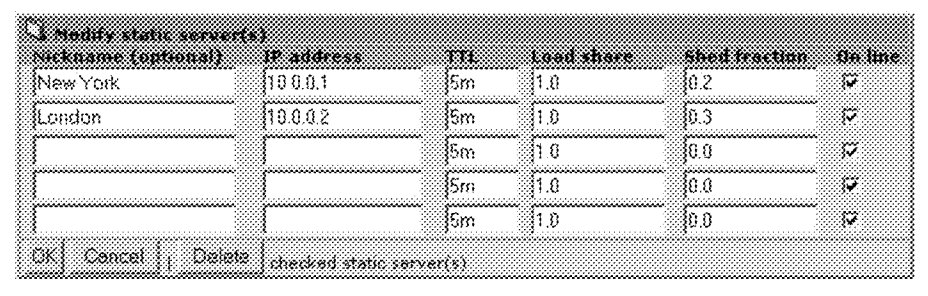

For each resource server, an on-line flag may also be set to indicate whether the server is currently available. This flag is shown in FIG. 9(a) in the rightmost column. With this flag, a server may be temporarily removed from the service, if, for instance, a server needs to be taken down for maintenance.

Due to the fact that dynamic servers are expected to change relatively frequently, policies that govern their selection may be defined in two stages. The policies for dynamic servers may be initially specified in a similar fashion as for static servers. For instance, load share and shed fraction can be defined for dynamic servers New York and London, as shown in FIG. 9(a). During operation, however, the policies that govern the selection of dynamic servers may be established dynamically. For example, initially defined policies (e.g., load share, shed fraction, and on-line flag) may be adaptively revised based on, for instance, an on-line status report retrieved from one or more specified locations on the network. Dynamic policies provide considerable flexibility in how the selection may be conducted in a manner that is adaptive to the network health or any other network performance related factors (e.g., maintenance).

Figure 9B:
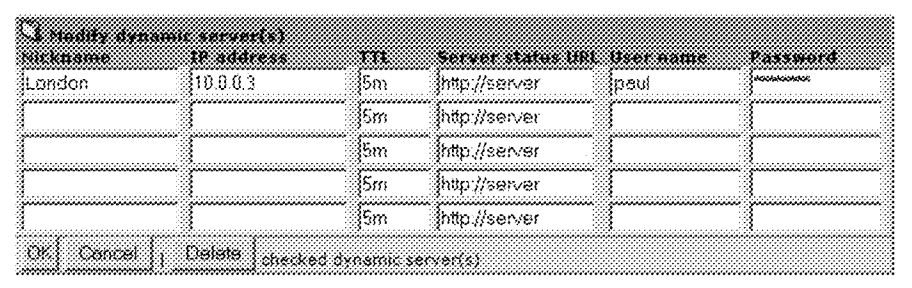

The on-line status report may be provided at one or more network locations specified by the subscriber. The locations may be specified as a Uniform Resource Locator (URL) and may be accessed through an HTTP request. A location of the status report may be specified in the initial policy, providing a constant link to the location. FIG. 9(b) shows an exemplary GUI for specifying an URL link to a status report. An URL link for the location of the status report is specified as "http://server" which corresponds to a server named London with an IP address of 10.0.0.3. The access may be authenticated and such authentication requirements may also be specified in the initial policies. The on-line accessed status report may be constructed based on information gathered during monitoring the servers' performance. For instance, each server in the subscriber server network may provide a status report containing information related to its performance. Name servers in the ATC name server network may poll such information from such servers and such information may be used to update policies.

The frequency with which the status report is accessed may also be specified explicitly. For example, it may require the relevant mechanisms (specifically, the ATC policy management mechanism or the monitoring mechanism of each name server) to poll the status report at a regular time, e.g., every thirty seconds.

A status report may be constructed using some standard language such as extendible Markup Language (XML). Such a status report may contain revised policies, which may be determined by the subscriber manually based on network performance, devised by an automated process based on network performance, or may be generated by an individual managed server. In such cases, the status report includes updated policies and when it is polled, the updated policies are used in future traffic control. For example, a managed server may re-define its load share of according to its dynamic capacity. When such dynamically defined load share information is accessed and used in enforcement, the traffic is controlled in a manner that is adaptive to the network dynamics.

When a status report is accessed, the relevant mechanisms (e.g., the ATC policy management mechanism in the ATC administrative framework or the ATC mechanism in corresponding name server) updates the associated policies based on the information contained in the status report. For example, a status report may indicate that the current load share for server New York should be 0.4 (down from 1.0 previously) with the same shed fraction (0.2) and the current load share for server London should be 0.5 (down from previous 1.0) with 0.4 shed fraction (40% shed fraction). An alternative scenario may be that the status report provides network performance data about each dynamic server and the ATC mechanism, after accessing the status report, determines how the current policies may be revised accordingly.

When the status report provides dynamic policies, it may, in general include, for each dynamic server, the following information: <ServerStatus loadShare="LS" shedFraction="SF" online="Boolean"/>, where LS and SF represent numerical numbers and "Boolean" represents a logical value of either "true" or "false".

With the mechanism of dynamic policies described above, a subscriber or a server can easily specify changes to existing policies (e.g., changes to load share, shed fraction policies and the On-line flag) without having to update an entire ATC policy hierarchy. In addition, a parameter (called "Down on line" in some embodiments) can be set in an ATC policy to control the behavior of the ATC mechanism under the circumstance that the ATC policy management mechanism is unable to properly access the status report due to reasons such as a failed polling or retrieval or failing to parse the status report's content. According to some embodiments of the present invention, three different exemplary approaches may be applied to handle the situation.

With the first approach, a subscriber may instruct an ATC mechanism in a name server not to select a particular server if the status report for that server can not be properly obtained. The subscriber may specify this policy by setting parameter "Down on line" to false. In this case, the ATC mechanism will not consider the underlying server as a candidate for selection process until the polling mechanism retrieves a valid status report.

The second approach to deal with a polling failure is to allow the ATC mechanism to select the underlying dynamic server according to its default policies (or original policies). To specify this solution, the subscriber may set the "Down on line" parameter true.

The third approach to handle the situation where the status report can not be properly retrieved is to allow the ATC mechanism to select the underlying server if its "on line" flag is on (it is available). To achieve this, a subscriber may specify only the "on line" ServerStatus in the status report, with parameter "Down on line" set to either true or false. In this case, the ATC mechanism will use a load share and a shed fraction specified in the policy when the "On line" flag is set to true. The load share and the load shed fraction may both be dynamically determined (either broadcasted from the ATC policy management mechanism or polled by the ATC mechanism 130 from the underlying server.

Figure 9C:
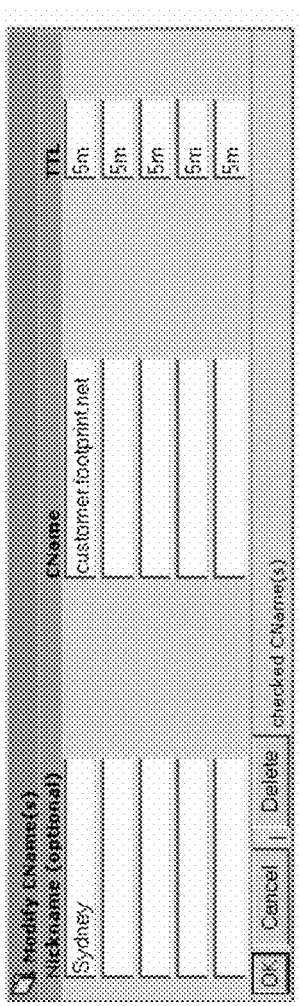
FIG. 9(c) shows an exemplary graphical user interface through which an overflow server may be defined using a canonical name, according to embodiments of the present invention.

Both static and dynamic servers are primary servers, although their selection may be controlled by operationally different policies. The third type of servers are called overflow servers. They provide alternatives when primary servers, for some reason, can not be selected. Typically, an overflow server corresponds to a Canonical name or CName, pointing to a service providing a CDN (such as, e.g., Cable & Wireless PLC's Footprint service). The choice of overflow servers may be determined based on the belief that they are in general always available. An overflow server may be defined through a window illustrated in FIG. 9(c). In FIG. 9(c), overflow servers are defined by a CName, which points to the CDN server address "customerfootprint.net" (e.g., the CDN 105, shown in FIG. 1).

Figure 10A:
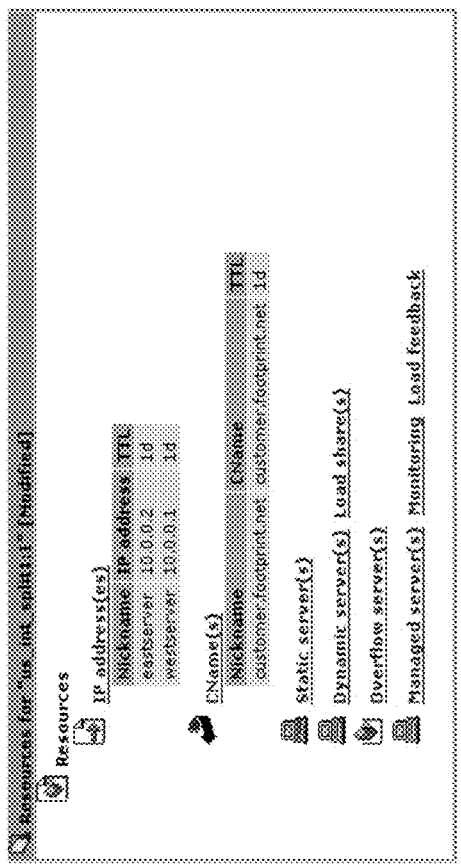
FIGS. 10(a)-10(b) show example subscriber policies, defined based on a set of resource servers, that govern the selection according to geographical location of an incoming request and the time zone of each of the locations, according to embodiments of the present invention.
Figure 10B:
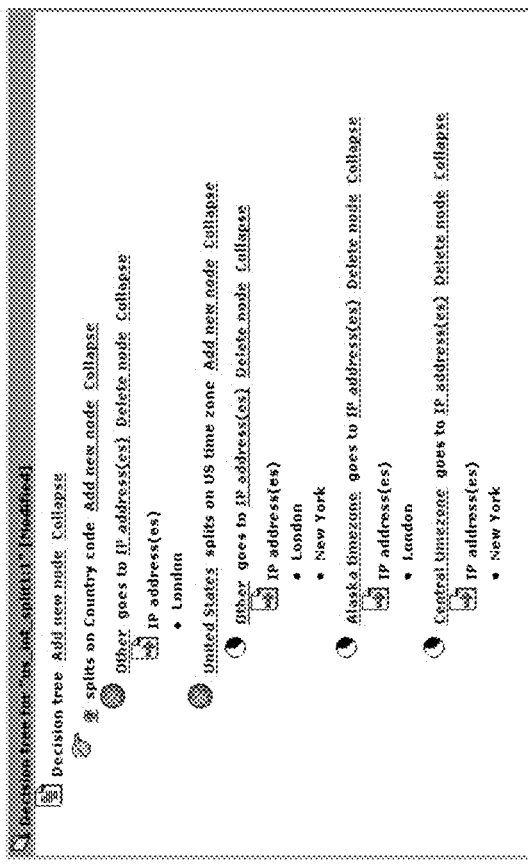

FIGS. 10(a)-10(b) show example subscriber policies, defined based on a set of resource servers, that govern the selection of the servers according to different criteria such as geographical location of an incoming request and the time zone of each of the locations. In FIG. 10(a), three different resource servers are defined, including an "eastserver" with IP address 10.0.0.2, a "westserver" with IP address 10.0.0.1, and a service network with CName "customer.footprint.net". Here, the service network may include more than one servers.

FIG. 10(b) shows an exemplary decision tree embedded in a set of geographical policies that guide how the traffic should be directed to a set of servers. In the decision tree depicted in FIG. 10(b), the selection is first directed to different resources at the top level according to a split between the United States and rest of the world. A resource may correspond to either a single server (or CDN) or a group of servers (or CDNS). A request initiated from non-U.S. geographical regions is directed to a resource named "London". Within the United States, time zone based policies are further applied. A request initiated from a region within the central time zone is directed to a resource named "New Work". A request initiated from a region within Alaska time zone is directed to the resource "London". Finally, a request initiated from a region within the United States that does not fall in any of these time zones (i.e., Alaska or Central) can be directed to either "London" or "New York".

Figure 10C:
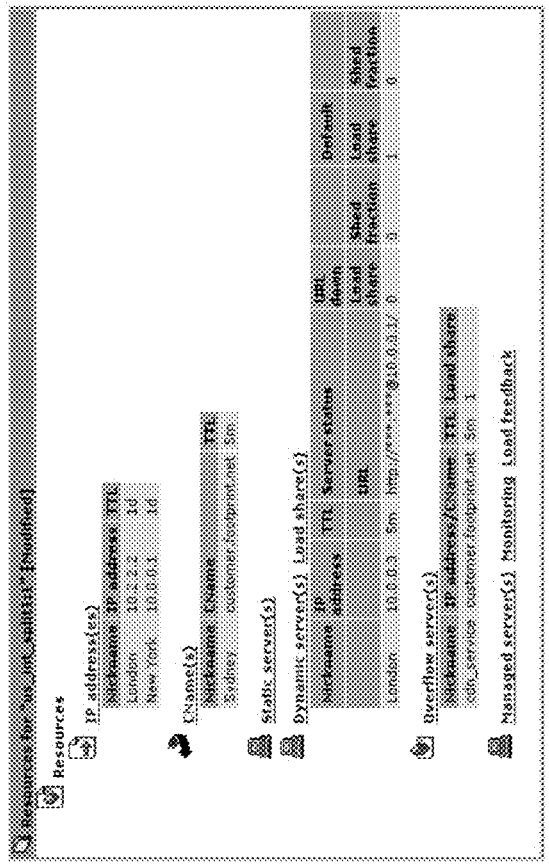
FIGS. 10(c)-10(d) show example subscriber policies, defined based on geographical locations of an incoming request with overflow policies that allow the ATC mechanism 150 to direct traffic to pre-defined services when primary servers are not available, according to embodiments of the present invention.
Figure 10D:
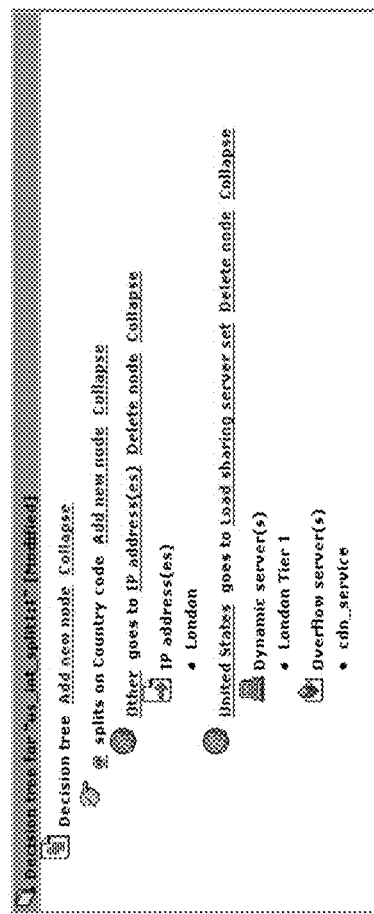

FIGS. 10(c)-10(d) show another example decision tree constructed based on a set of resources (servers or CDNs) and subscriber policies that are defined based on geographical locations of an incoming request with overflow policies that allow the ATC mechanism to direct traffic to pre-defined overflow servers when primary servers are not available. In the Resource window shown in FIG. 10(c), three resources are defined: static resources "London" and "New York", each defined based on its IP address, a service network named "Sydney" with CName "customer.sandpiper.net". Each resource may correspond to a set of servers such as a server group with certain hierarchy. Resource "London" is further defined as a dynamic resource and resource "Sydney" is further defined as an overflow server network nicknamed "cdn_service". FIG. 10(d) illustrates an example decision tree built based on these resources.

The decision tree in FIG. 10(d) first splits two ways at the top level based on whether a request is from the United States. When a request is initiated from the United States, it is directed, according to the policies illustrated in FIG. 10(d), to the dynamic servers at the first tier of resource "London". A request from the United States may also directed to one of the overflow servers in resource "cdn_service". This may happen when either all the primary servers at the first tier of resource "London" fail to function or when such primary servers are overloaded.

In addition to the various web-based interfaces described herein, there are also other means through which subscriber policies may be defined. As discussed earlier, for example, subscriber policies may also be constructed or specified in an XML file which can be downloaded by an ATC mechanism and used to control the traffic.

Policies defined via different means (e.g., through web based GUI or XML file) may be converted into some pre-defined format within the ATC mechanism. Such pre-defined format may be designed for efficiency in manage and handling the ATC policies. For example, the internal format for ATC policies may be designed so that, internally, the AMAs can conveniently store, access, and broadcast the ATC policies to the name server agents and the name server agents can efficiently apply the policies.

Figure 11A:
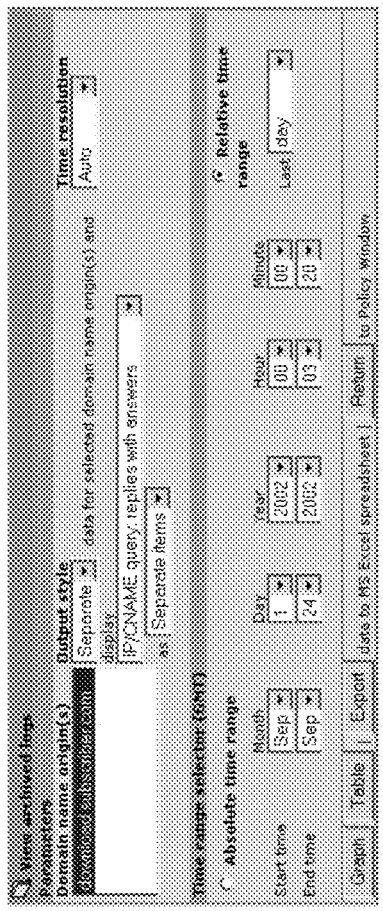
Figure 11B:
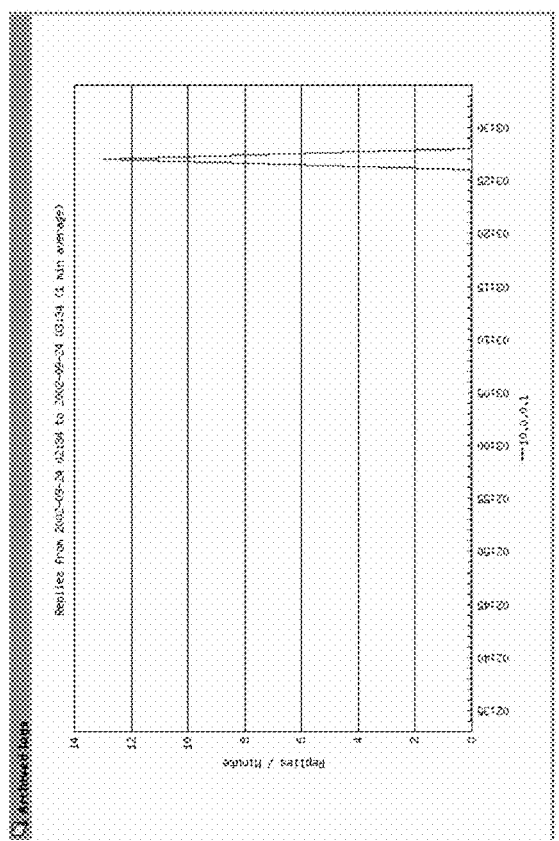
Figure 11C:
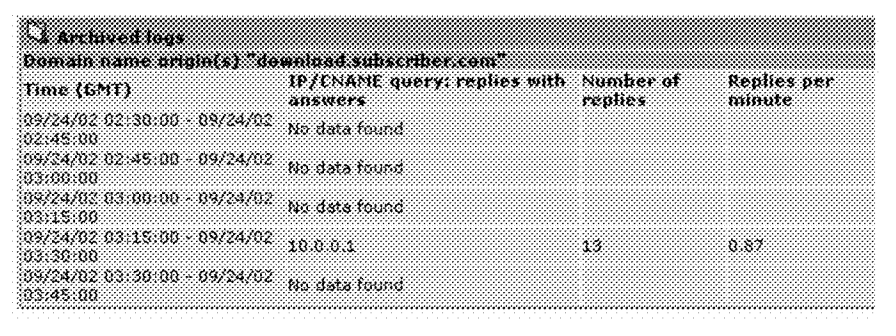

As mentioned earlier, in addition to management of the ATC policies, the AMA may also monitor the performance of name servers and generates viewable DNS log reports. The monitoring mechanism may gather performance information from either the DNS logs of the name servers or the events trapped from the name servers. Such gathered information may be used by the report generation mechanism to construct informative reports. The report generation mechanism may also make such reports available to the subscribers via the secure web-based GUI. FIGS. 11(a)-11(c) show exemplary types of report information that is accessible via the secure web-based GUI. FIG. 11(a) depicts a web interface that allows a subscriber to view DNS log data of a specified resource server. A subscriber can specify the name of the server under review (e.g., "download.subscriber.com"), the form in which the log data is to be organized (e.g., specify output style of "Separate", meaning to display IP and CName queries and replies with answers as separate items in the output), the time period under review (e.g., from Sep. 1, 2002 to Sep. 24, 2002), and the time resolution used in displaying the log data (e.g., automatically select time resolution).

FIG. 11(b) shows a plot of log data related to a specified server. The log data is presented in a plot, generated based on the log entries of a particular server against a specified period of time (X-axis) with certain resolution. The exemplary plot reflects the volume of the traffic directed to the underlying server during a period time between 2:30 pm and 3:30 pm on Sep. 24, 2002. The traffic volume is described in terms of number of replies generated by the underlying server per minute (Y-axis). It can be seen in this example plot that there is a surge in traffic volume between 2:36 pm and 2:38 pm. FIG. 11(c) shows a graphical display for the same log data in FIG. 11(b) in a table form, in which the log data is listed in an chronicle order from top to the bottom of the table. For instance, each row in the left column lists a period of time. In the exemplary table, the log data within the one hour period (2:30 pm to 3:30 pm) is divided into a plurality of sub-periods, each of which is 15 minutes. For each sub-period, the third column provides the number of replies from the corresponding sub-period. For instance, during the sub-period of 3:15 pm to 3:30 pm, there are 13 replies and there is no reply in other sub-periods (consistent with the plot illustrated in FIG. 11(b)).

The various mechanisms described herein, including, without limitation, the adaptive traffic control (ATC) mechanism, the location determination mechanism, policy editing mechanism, administrative policy update mechanism, ATC policy management mechanism, report generation mechanism, a monitoring mechanism, and an administrative master backup mechanism may be implemented in hardware, software or a combination thereof. When implemented in software, they may be implemented in any type of appropriate interpreted or compiled programming language. When implemented fully or partially in software, aspects of the invention can reside on any memory or storage medium, including but not limited to a ROM, a disk, an ASIC, a PROM and the like. While the invention has been described with reference to particular mechanisms (algorithms, processes and functions) and architectures, one skilled in the art would realize that other mechanisms and/or architectures could be used while still achieving the invention.

When the various mechanisms of the present invention are running on a particular machine (e.g., the at a client or on a server), they may reside in the memory of the machine or on a storage device or in a combination. Further, while many of the operations have been shown as being performed in a particular order, one skilled in the art would realize that other orders, including some parallelization of operations, are possible and are considered to be within the scope of the invention.

The present invention has been described above in connection with a preferred embodiment thereof; however, this has been done for purposes of illustration only, and the invention is not so limited. Indeed, variations of the invention will be readily apparent to those skilled in the art. Such variations also fall within the scope of the invention. Thus, while the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

The processing described may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

We claim:

1. A method comprising:
  receiving from a subscriber, via a web-based graphical user interface, one or more policies for distribution of service requests to one or more servers in a subscriber server network;
  monitoring an operational status of at least some of a plurality of name servers in a name server network that provides hostname resolution services for the one or more servers in the subscriber server network;
  based on said monitoring, when an error or anomalous condition is detected at a particular name server of the name server network, creating a policy to indicate the status of the particular name server, wherein the policy is taken into account when resolving hostnames using the name server network; and
  sending an alert regarding the error or anomalous condition detected at a particular name server to the subscriber via the web-based graphical user interface.

2. The method of claim 1 wherein the error or anomalous condition at the particular name server is based one or more events that occurred in the name server during operation.

3. The method of claim 1 wherein the error or anomalous condition at the particular name server means that the particular name server is not available, and wherein the policy indicates that the particular name server is unavailable.

4. The method of claim 1 further comprising:
  supplying logging and monitoring data to an administrative framework.

5. The method of claim 1 wherein said monitoring comprises monitoring events from said name server network.

6. The method of claim 5 wherein said monitoring comprises monitoring events from multiple name servers in said name server network.

7. The method of claim 6 further comprising:
  consolidating said events from said multiple names servers;
  determining, based on said events from said multiple names servers, whether there is an alarming situation; and
  based on said determining, generating an alert.

8. The method of claim 1 wherein the framework includes a plurality of name servers forming a name server network and implementing policy-based name resolution.

9. The method of claim 1 operable in an adaptive traffic control (ATC) framework in which resources of one of more content providers may be delivered to clients from at least one content delivery network (CDN).

10. The method of claim 9 wherein delivery of content of a particular content provider to a client involves at least one of said name servers resolving a hostname associated with the content.

11. A method comprising:
  monitoring an operational status of at least some of a plurality of name servers in a name server network that provides hostname resolution services to at least a first subscriber, wherein the first subscriber is a content provider;
  based on said monitoring, when an error or anomalous condition is detected at a particular name server, creating a policy to indicate the status of the particular name server; and
  sending an alert regarding the error or anomalous condition to the first subscriber and to a network operations center (NOC), wherein the policy is taken into account when resolving hostnames using the name server network, wherein the error or anomalous condition at the particular name server is based one or more events that occurred in the name server during operation, and wherein the error or anomalous condition at the particular name server means that the particular name server is not available, and wherein the policy indicates that the particular name server is unavailable.

12. The method of claim 11 further comprising:
supplying logging and monitoring data to an administrative framework.

13. The method of claim 11 wherein said monitoring comprises monitoring events from said name server network.

14. The method of claim 13 wherein said monitoring comprises monitoring events from multiple name servers in said name server network.

15. The method of claim 14 further comprising:
consolidating said events from said multiple names servers;
determining, based on said events from said multiple names servers, whether there is an alarming situation; and
based on said determining, generating an alert.

* * * * *